(12) United States Patent
Julien et al.

(10) Patent No.: US 12,484,553 B2
(45) Date of Patent: Dec. 2, 2025

(54) DOG TOY ODOR DEVICE, TRAINING DEVICE, ASSOCIATED INTERACTIVE PLATFORM, AND METHOD

(71) Applicants: Colby Julien, Lyons, IL (US); Ross Julien, Lyons, IL (US)

(72) Inventors: Colby Julien, Lyons, IL (US); Ross Julien, Lyons, IL (US)

( * ) Notice: Subject to any disclaimer, the term of this patent is extended or adjusted under 35 U.S.C. 154(b) by 0 days.

(21) Appl. No.: 18/658,849

(22) Filed: May 8, 2024

(65) Prior Publication Data
US 2024/0373823 A1    Nov. 14, 2024

Related U.S. Application Data

(60) Provisional application No. 63/464,711, filed on May 8, 2023.

(51) Int. Cl.
    *A01K 15/02*         (2006.01)

(52) U.S. Cl.
    CPC .......... *A01K 15/026* (2013.01); *A01K 15/021* (2013.01)

(58) Field of Classification Search
    CPC .... A01K 15/026; A01K 15/021; A01K 15/02; A01K 29/005; Y10S 119/905
    See application file for complete search history.

(56) References Cited

U.S. PATENT DOCUMENTS

| | | | | |
|---|---|---|---|---|
| 10,485,219 B1* | 11/2019 | Hughes | ................ | A01K 15/02 |
| 12,041,908 B2* | 7/2024 | Ebbers | ................ | A01K 15/021 |
| 2001/0047771 A1* | 12/2001 | Bulanda | ................ | A01K 15/02 |
| | | | | 119/712 |
| 2006/0174843 A1* | 8/2006 | Poyner | ................ | A01K 15/027 |
| | | | | 119/712 |
| 2010/0242859 A1* | 9/2010 | Raymond | ............ | A01K 15/026 |
| | | | | 119/719 |
| 2023/0058034 A1* | 2/2023 | Helfers, III | .......... | A01K 5/0114 |

\* cited by examiner

*Primary Examiner* — Trinh T Nguyen
(74) *Attorney, Agent, or Firm* — Theodore J. Chiacchio; Chiacchio IP, LLC

(57) ABSTRACT

A dog toy odor device, training device, and associated interactive platform is provided for entertaining and training dogs using a toy or other device, which may be supplemented by a companion interactive platform. The dog toy odor device, training device, and associated interactive platform may include a housing unit, emission apertures, odor carrier, identification marker, adhesives and sealants, geo-location features and interactive interface. A method for entertaining and training dogs using a toy or other device, which may be supplemented by a companion interactive platform using the dog toy odor device, training device, and associated interactive platform is also provided.

7 Claims, 29 Drawing Sheets

FIG. 21

DOG TOY ODOR DEVICE, TRAINING DEVICE, ASSOCIATED INTERACTIVE PLATFORM, AND METHOD

FIELD OF THE INVENTION

The present disclosure relates to a dog toy odor device, training device, associated interactive platform, and an associated method. More particularly, the disclosure relates to entertaining and training dogs using a toy or other device, which may be supplemented by a companion interactive platform.

BACKGROUND

Dog toys play a crucial role in keeping our dogs engaged, stimulated, and entertained. They not only provide a source of amusement for dogs but also serve as valuable tools to teach them various skills, such as identifying scents. Through scent training, dogs learn to associate definable scents with their toys, helping them develop their olfactory abilities, and become more adept at tracking and finding objects. This type of training is particularly beneficial for working dogs, such as search and rescue or detection dogs, as it sharpens their senses and enhances their capabilities.

However, a challenge with current training toys and games is that they may not be engaging enough for dogs and/or their trainers, leading to a lack of interest and reduced effectiveness of the training. Existing toys and training devices are believed to be deficient in providing stimulating elements that facilitate keeping dogs interested and focused during short-term and long-term training sessions. There lacks in the current state of the art a dog toy and/or training device that can improve the overall effectiveness of scent training and ensure that dogs continue to learn and grow.

Therefore, a need exists to solve the deficiencies present in the prior art. What is needed is a toy and/or device to entertain dogs while training to identify a scent. What is needed is a toy and/or device to train dogs to detect an odor that is engaging to the dog. What is needed is a toy and/or device to entertain and train dogs that can be used with a companion interactive interface. What is needed is a toy and/or device to improve nosework training with dogs in an outdoor setting and/or an indoor setting. What is needed is a toy and/or device capable of being geo-located via an interactive companion device to provide entertainment and/or training to a dog.

SUMMARY

An aspect of the disclosure advantageously provides a toy and/or device to entertain dogs while training to identify a scent. An aspect of the disclosure advantageously provides a toy and/or device to train dogs to detect an odor that is engaging to the dog. An aspect of the disclosure advantageously provides a toy and/or device to entertain and train dogs that can be used with a companion interactive interface. An aspect of the disclosure advantageously provides a toy and/or device to improve nosework training with dogs in an outdoor setting. An aspect of the disclosure advantageously provides a toy and/or device capable of being geo-located via an interactive companion device to provide entertainment and/or training to a dog.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

BRIEF DESCRIPTION OF THE DRAWINGS

FIG. 21 is a wireframe view of an illustrative display screen provided by an interactive interface, according to various embodiments of this disclosure.

DETAILED DESCRIPTION

Figure 1:
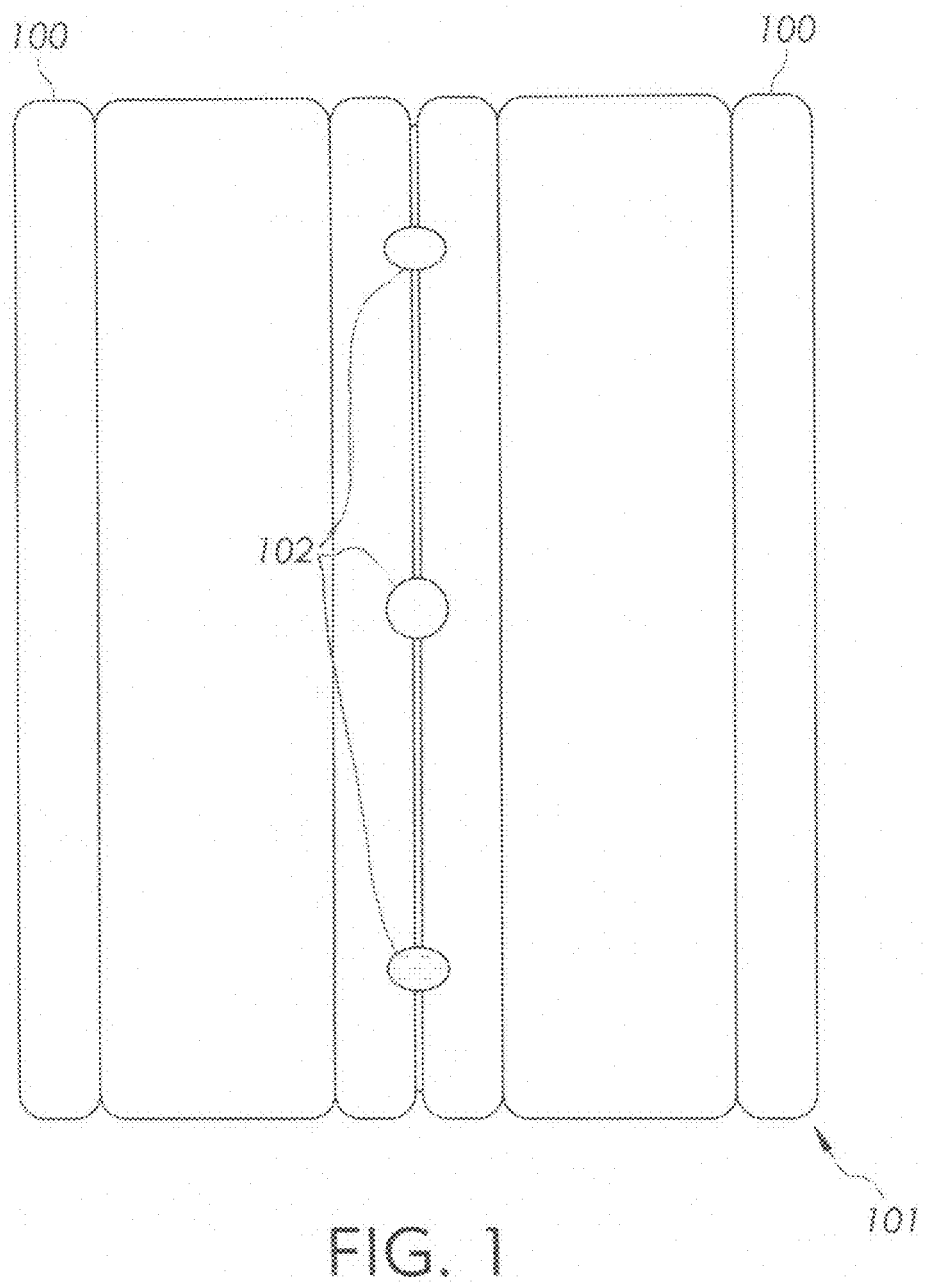
FIG. 1 is a side elevation view of an illustrative dog toy odor device, according to an embodiment of this disclosure.

The following disclosure is provided to describe various embodiments of a dog toy odor device, training device, and associated interactive platform. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

For the purpose of clearly describing the components and features discussed throughout this disclosure, some frequently used terms will now be defined, without limitation. The term "nosework," as it is used throughout this disclosure, shall mean a type of dog training that involves teaching dogs to use their sense of smell to locate definable scents or objects. The terms "scent" and "odor," as they are used throughout this disclosure, shall both mean any type of fragrance, aroma, or substances that are detectable by olfactory nerves that are perceivable through the nose of animals such as dogs, including pleasant or unpleasant smells, natural or synthetic fragrances, and subtle or strong scents. The terms "trainer" or "handler," as used throughout this disclosure, shall both mean a person that works with animals, manages their behavior, and directs them to perform definable tasks or functions. The term "odor carrier," as used throughout this disclosure, shall mean an article comprising scent-emitting material such as, without limitation, a scent-impregnated material(s); a scent-emitting capsule(s), which may be slow-release; a scent-emitting cartridge(s) (or "scent cartridges"); or a scent-emitting pod(s). The term "odorless carrier," as used throughout this disclosure, shall mean an article that may be locatable in the same manner as an odor carrier, and does not emit an odor. The term "treat," as used herein, shall mean a food item that the dog periodically receives separate and apart from the game and may be already accustomed to receiving. Treats may include, by way of example only and without limitation, kibble or a human food item such as meat or cheese. The term "mission(s)," as used herein, shall mean specific training exercises or games where a dog toy odor device is positioned at a defined location and an animal is manually guided toward the vicinity of the dog toy odor device and then released from manual control and allowed an opportunity to find the dog toy odor device based on the scent being emitted from the device.

Various aspects of the present disclosure will now be described in detail. In the following disclosure, an animal toy odor device, training device, and associated interactive platform will be discussed. Those of skill in the art will appreciate alternative labeling of the dog toy odor device, training device, and associated interactive platform as a nosework training apparatus, toy for odor detection in animals, scent engagement device, interactive dog toy and training device, the invention, or other similar names. Similarly, those of skill in the art will appreciate alternative labeling of the method for using a dog toy odor device, training device, and associated interactive platform as a nosework training method using a corresponding toy and/or device, method of scent training and entertainment for dogs, training methods to engage dogs and improve scent recognition, method, operation, the invention, or other similar names. Skilled readers should not view the inclusion of any alternative labels as limiting in any way. It is expressly contemplated that dog toy odor devices, and the associated systems and methods, described herein, may be used to train and/or entertain certain animals other than dogs as well in substantially the same manner as dogs. The specific additional animals over and above dogs for which the devices, systems, and methods described herein may be well-suited will be readily discernible by those skilled in the art.

Referring now to FIGS. 1-29, the dog toy odor device, training device, and associated interactive platform will now be discussed in more detail. The dog toy odor device, training device, and associated interactive platform may include, without limitation, a housing unit, emission apertures, odor carrier, identification marker, adhesives and sealants, geo-location features, interactive interface, and additional components that will be discussed in greater detail below. The dog toy odor device, training device, and associated interactive platform may operate one or more of these components interactively with other components for training and entertaining dogs using a toy or other device, which may be supplemented by a companion interactive platform.

As will be discussed through the following examples and embodiments, the present disclosure is related to a novel animal toy that is designed to emit a scent, drawing animals to locate it and, in some instances, engage with it. The animal toy may be used for entertainment and training purposes. This innovative toy may offer a unique experience for animals, combining the thrill of a scent hunt with the excitement of a traditional toy. The scent-emitting toy may be crafted from durable, non-toxic materials, ensuring it can withstand the rigors of extended play while providing a safe and enjoyable experience for dogs interacting with the toy.

Generally, a handler and their dog may use the dog toy odor device for either outdoor or indoor scent training or entertainment. The device may have apertures. In one, non-limiting, embodiment, the apertures may be sized so as to allow the odor to escape into the air for the dog to smell without the mixture being polluted by outside sources. The device may contain adhesive components to ensure the integrity of the device in various environments as well as prevent destruction by humans or animals. The device may contain identification marks for the handler to identify the toy using an interactive interface, for canine odor competitions, or for other purposes.

The device may feature a scent-release mechanism that can be activated by the pet owner. In some embodiments, the scent may be applied to a substrate. In other embodiments, a replaceable scent cartridge may be used to interchange a variety of aromas that teach the dog to detect various scents by encouraging the dog to search for and interact with the toy. The scent may be reapplied to ensure that the scent remains potent and effective over time. For embodiments featuring interchangeable scents, the option to switch between different scents may keep the experience fresh and engaging for the dog.

Advantages provided by a scent-emitting dog toy device enabled by this disclosure may include its ability to enhance a dog's natural tracking and hunting instincts. By providing a stimulating and challenging activity engaging these instincts, the toy may offer a mentally enriching experience for dogs of various breeds and sizes to entertain and promote mental sharpness and problem-solving skills, contributing to overall cognitive development of the dog.

In addition to its mental benefits, the scent-emitting dog toy may also provide an opportunity for physical exercise of the dog. As the dog searches for the source of the scent, it engages in physical activity that helps maintain a healthy weight, build muscle strength, and improve cardiovascular fitness. This combination of mental and physical stimulation makes the toy an ideal choice for pet owners, trainers, handlers, and other users seeking a well-rounded play and/or training experience for their dogs.

The scent-emitting dog toys described herein also serve as a valuable training tool for both working dogs and non-working dogs. Such working dogs may include but are not limited to search and rescue or detection dogs. By using the toy in combination with professional training techniques, dog handlers can reinforce their dogs' scent-detection abilities and improve their overall performance in the field. This versatile toy may offer a practical and engaging way to hone dogs' skills while keeping them motivated and focused.

This dog toy odor devices and associated systems and methods described herein are not only enriching and entertaining for dogs but also may be an exciting game for the handler or user. Experiencing the growth of your dog may bring excitement and entertainment to the handler, user, or spectators. Users and handlers may also benefit from having a more disciplined dog. Additionally, individuals in need may benefit from the dog's searching abilities and other skills developed using the devices, systems, and methods described herein.

The housing unit will now be discussed in greater detail. FIGS. 1-4 highlight examples of the housing unit, which may also be shown in other figures. The housing unit may include a housing body 100 and a lid 101. In some embodiments, the lid may be removable. The housing unit may be made using robust, non-toxic materials that can withstand the wear and tear of play by the dog, which may advantageously ensure reliable and durable use by the dog and handler. Housing materials may include but are not limited to, thermo-elastic plastic, nylon, synthetic rubber, polyvinyl chloride, silicone, wood, natural materials such as rubber, bone, and fibers. Moreover, the removable lid feature may allow pet owners to easily access and clean the interior, maintaining a safe and hygienic experience for the dogs interacting with the toy.

In some embodiments, the housing unit may be provided as a unitary piece of material. In other embodiments, such as that shown in FIG. 1, the housing may include multiple pieces operatively joined together, for example, via adhesion, welding, snap fit, via continuous thread, screw caps, zipper, fasteners, buckles, without limitation. The lid 101 may be reversibly installed to the housing.

The housing may be constructed using one or more materials. Some illustrative materials may include, without limitation, rubber, wood, plastic, metal, ceramic, synthetic fibers, or composites.

Figure 2:
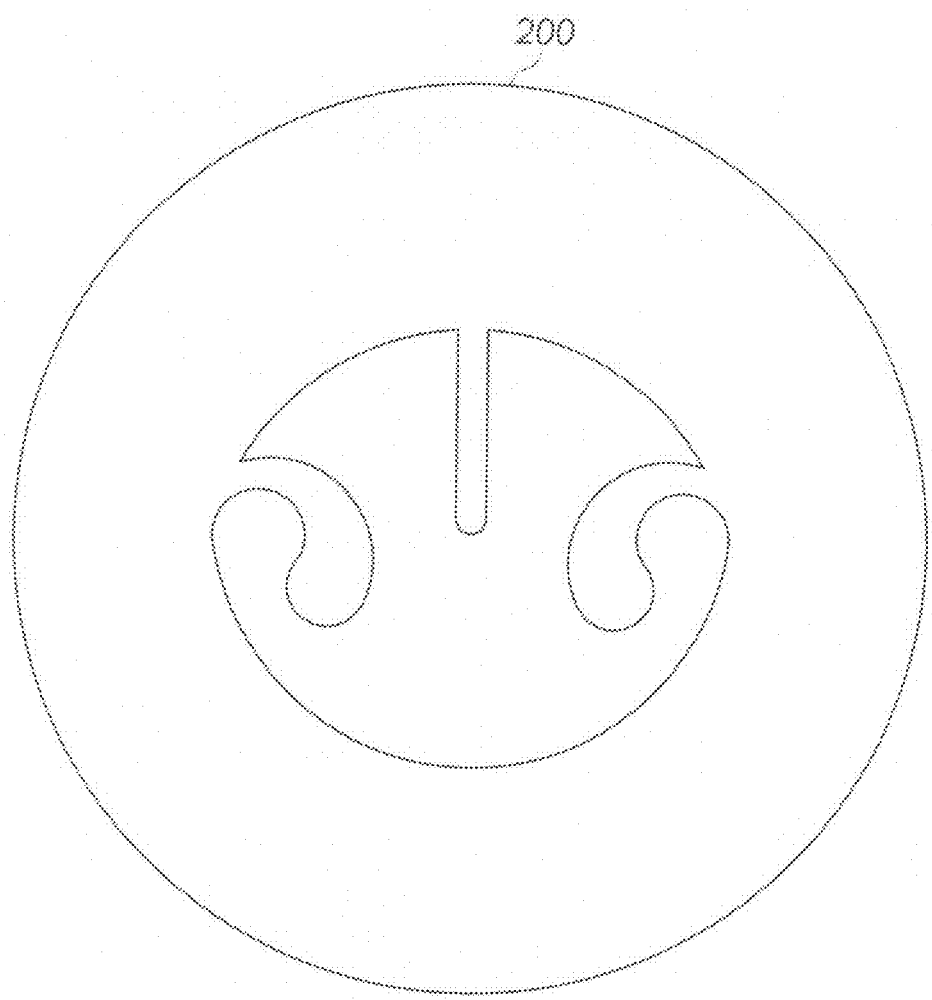
FIG. 2 is a top plan view of an illustrative dog toy odor device, according to an embodiment of this disclosure.

The emission apertures will now be discussed in greater detail. FIGS. 1 and 2 highlight examples of the emission apertures, which may also be shown in other figures. The scent-emitting dog toy may incorporate emission apertures on the lid or sides, allowing the scent, odor, or other aroma to disperse and be easily detected by a dog's sense of smell. These emission apertures may help ensure that the scent is released effectively and consistently, providing a strong and clear stimulus for the dog to follow. The emission apertures may be engineered to balance scent distribution with durability, ensuring the toy remains robust and functional even as it is used, interacted with, and otherwise handled by a dog.

In one embodiment, the toy may feature a water-resistant design. Some embodiments of the toy may be crafted with materials and construction techniques that prevent water ingress, ensuring the scent substrate and/or cartridge and toy itself remain protected during play in damp or wet conditions or from dog saliva. This water-resistant feature not only extends the lifespan of the toy, but also allows dogs to enjoy the stimulating scent-chasing experience in various environments, such as at the beach, near a pool, or in rainy weather.

In at least one embodiment, the toy may be cleanable. Understanding that hygiene and cleanliness are crucial factors for pet owners, the scent-emitting dog toy can optionally be at least partially disassembled to provide access to interior spaces of the toy, allowing for thorough cleaning of its components. This cleanability advantageously allows the toy to remain substantially free of dirt, debris, and bacteria, promoting a safe and healthy play experience for dogs.

In various embodiments, the scent-emitting dog toy may be available in a range of sizes and shapes to cater to the needs of different dog breeds. For example, a first size may be provided with lightweight designs for small breeds. In another example, more robust options may be provided for bigger dogs. This flexibility allows pet owners, trainers, handlers, and others to select the ideal toy that will provide the most engaging experience for their dog and maximize training potential.

In one embodiment, the scent emission apertures 102 may feature adjustable sizes allowing a user to control the intensity and dispersion of the scent. For example, for dogs that require a more challenging experience or being trained to detect scents with higher sensitivity, the apertures can be adjusted to release a subtler scent. In another example, a stronger scent can be used for dogs that are new to scent-tracking, beginning nosework training, or require additional motivation. The size of the scent emission apertures 102 may also be adjusted to effect corresponding changes in difficulty level for a human to locate the dog toy. Embodiments of the present disclosure contemplate that a human may participate with a dog in locating the dog toy odor device, whether for purposes of entertainment or for purposes of aiding the dog in locating the precise location of the dog toy odor device.

Figure 3:
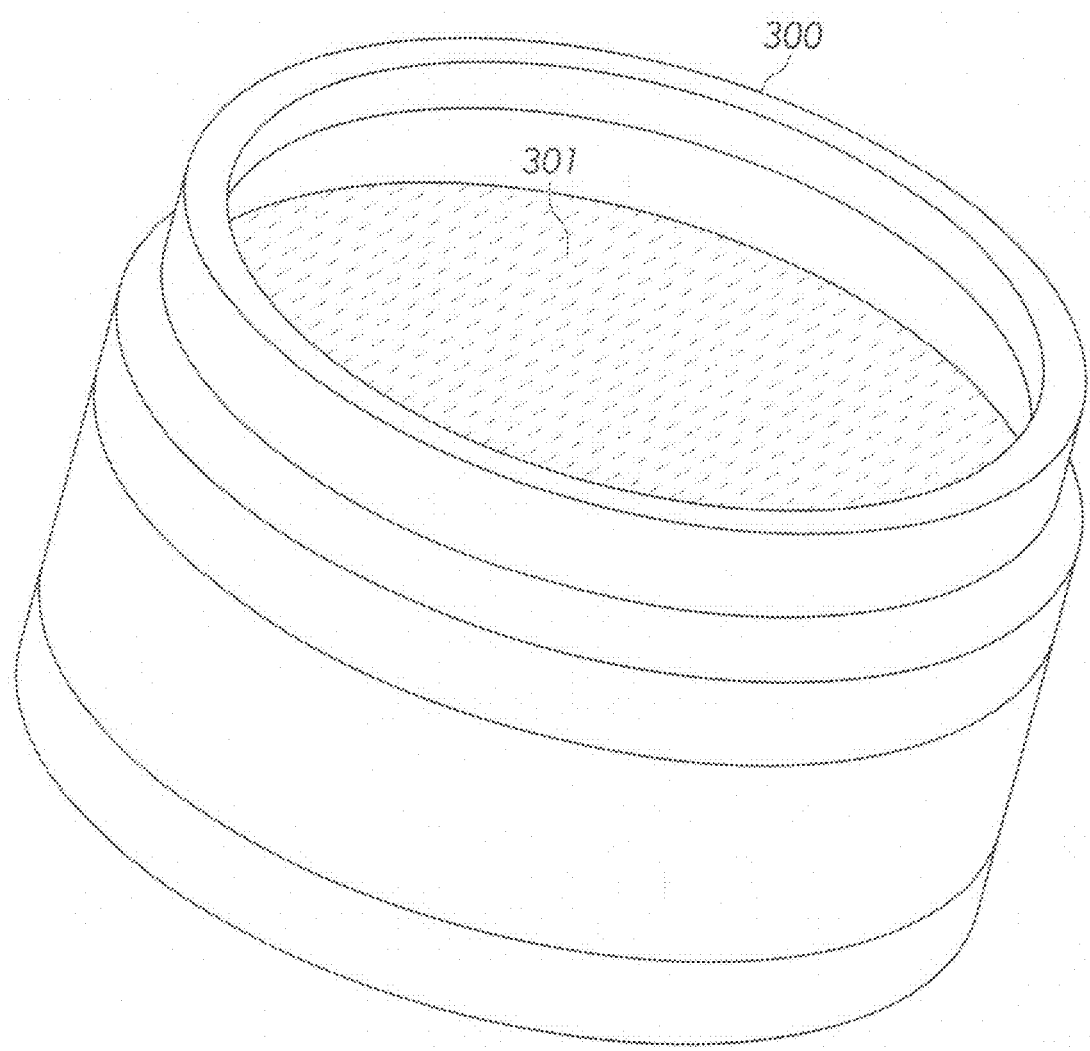
FIG. 3 is a perspective view of an illustrative dog toy odor device having a removed lid, according to an embodiment of this disclosure.

The odor carrier will now be discussed in greater detail. FIG. 3 highlights an example of the odor carrier 300, which may also be shown in other figures. The odor carrier may incorporate a variety of features to store and release the scent. In one example, a fabric or substrate 301 may be provided that is designed to absorb and gradually release the scent. This fabric can be infused with the chosen aroma, such as via a spray, liquid, oil, wax, and/or powder, without limitation. As the dog interacts with the toy, the scent may be slowly released from the fabric, providing a substantially consistent and long-lasting olfactory stimulus for the dog to follow.

In another embodiment, the odor carrier may include replaceable scent cartridges. These cartridges may be designed to fit securely within the toy, allowing pet owners to easily swap them out when the scent fades or to introduce new scents to maintain their dog's interest. The cartridges can contain a variety of scent mediums, such as gels, waxes, or oils, which gradually release the aroma through the toy's emission apertures during play or training.

In some versions of the toy, a scent-impregnated material may be used to create a consistent and enduring scent experience. This material, which can be made from rubber, silicone, or other durable substances, may be designed to hold, and gradually release the scent throughout the life of the toy. As the dog chews or manipulates the toy, the scent is slowly emitted, providing continuous stimulation and encouragement for the dog to interact with the toy.

In some embodiments, the odor carrier may feature slow-release scent-emitting capsules or porous membranes that provide for controlled release of the scent. In some embodiments, the odor mixture may include wax, oil, or virtually any other substance that carries the scent and/or odor. In some embodiments, the scent material, substrate, cartridge, pod, or other material may be at least partially biodegradable.

In some embodiments, treats, rewards, or articles that emit a human scent, may be used in connection with games and training methods as described herein.

Treats may be used as a distraction or for the purpose of locating the dog toy odor device that houses the article that emits a human scent or an odor carrier with different scent.

Games may vary by location, difficulty, amount of dog toy odor devices, amount of decoy dog toy odor devices, reward type and number of scents used.

Devices as described herein may comprise an odorless carrier instead of an odor carrier, or may otherwise omit an odor carrier. Decoy devices without an odor carrier may be utilized in games and training exercises as contemplated herein.

Such devices may be used as a decoy to train dogs to identify the dog toy odor devices that are emitting an odor. One benefit from using decoy dog toy odor devices is that dogs may be trained to identify and track a specific scent emitted by an odor carrier and not by visually identifying the housing unit of the dog toy odor devices.

Dog toy odor devices enabled by this disclosure may be used to entertain and teach animals to identify a scent which is then prepared and hidden indoors.

In an embodiment, dog toy odor devices enabled by this disclosure may come with instructions explaining how to use the dog toy odor devices.

Figure 4:
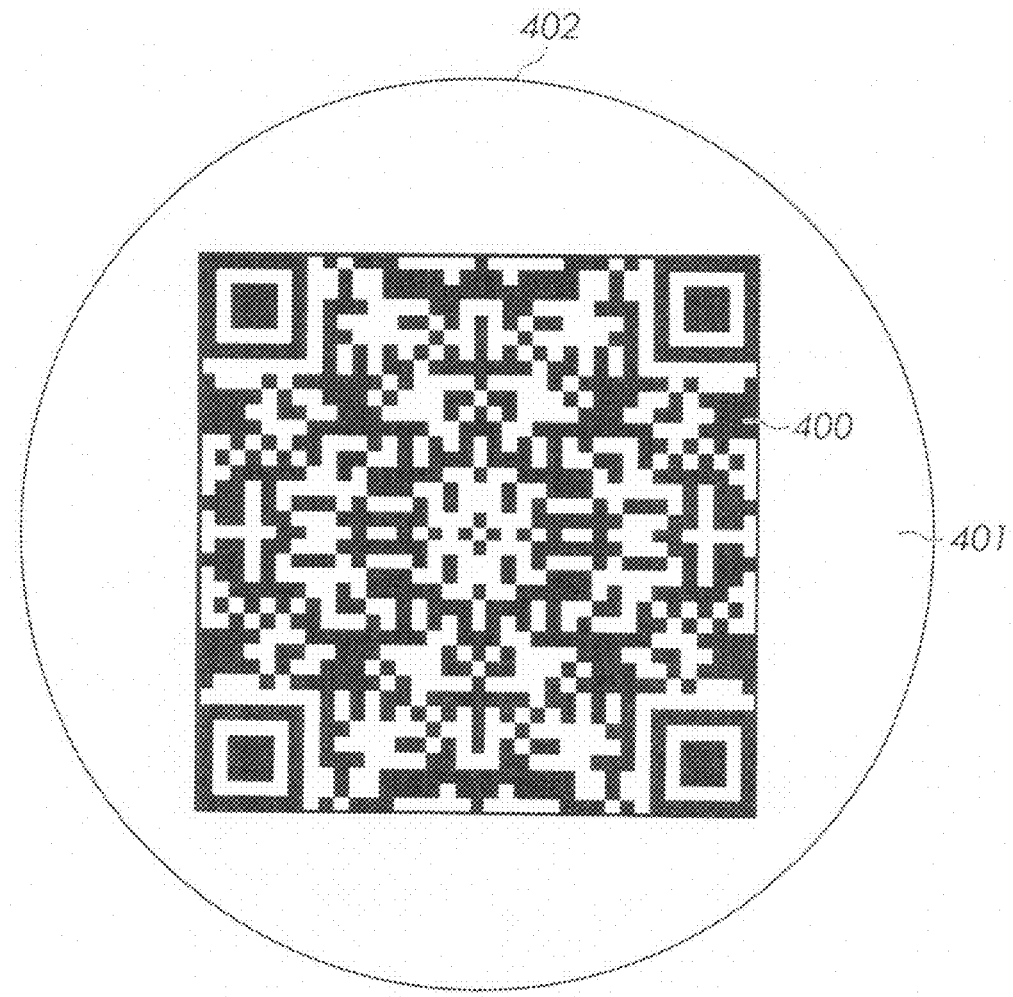
FIG. 4 is a bottom plan view of an illustrative dog toy odor device, according to an embodiment of this disclosure.

The identification marker will now be discussed in greater detail. FIG. 4 highlights examples of the identification marker, which may also be shown in other figures. An identification marker, such as a barcode or QR code 400, may be provided on a surface of the housing 401. In additional embodiments, the identification marker may include a chip or device that communicates a signal, for example, a radio signal. In some embodiments, an identification marker may use RFID, NFC, or other identifying technologies. In an alternative embodiment, the identification marker may comprise an alphanumeric code or a pictogram.

Inclusion of an identification marker may advantageously enable the toy to be easily identified and be associated with an interactive interface, such as may be accessible via smartphone application or through a website, providing users with valuable information and enhancing the overall experience of using the associated toy. In some embodiments, the identification marker can be located on the exterior of the toy or incorporated into its design without compromising its functionality or aesthetics.

In one embodiment, a user may interact with the identification marker by scanning a barcode or QR code 400 with a compatible smartphone or device to access an interactive interface that offers a range of valuable features and information. One such feature may include the ability to geo-locate or track the toy electronically, which may be useful during outdoor play where the toy might become lost or misplaced. With the help of the interactive interface, pet owners can easily locate the toy and retrieve it.

In an embodiment, upon a user scanning a barcode or QR code 400 with a compatible smartphone or device, an advertisement may appear on said smartphone or device. Operators of the interactive platform may charge a fee to advertisers for such advertising. This is one example of how the dog toy odor device, interactive platform, and/or methods of the present disclosure may be monetized.

In other embodiments, the dog toy device may include a Global Positioning System (GPS). The GPS capabilities may be communicatively connected with the interactive interface. This will allow for the user to track where the dog toy devices are located. The GPS feature may also be referred to as a geo-locator aspect.

In another embodiment, a GPS may be attached to the dog. This will allow for data to be captured by the interactive interface including but not limited to speed, location, and elevation of the dog's journey. This may also allow for the user to know when the dog has reached the vicinity of where the dog toy odor device is located. This indication may then be posted onto the interface to be shared with other users of the interface and to track the dog's progress.

In addition to geo-location capabilities, the interactive interface can optionally also provide users with essential information about the toy, such as its scent type, cartridge replacement schedules, and cleaning instructions. Furthermore, the interface may offer suggestions for games or training activities that incorporate the toy, enabling pet owners to explore new and engaging ways to interact with their dogs.

In some embodiments, the incorporation of an identification marker 400 and the associated interactive interface may provide opportunities for building a community of like-minded dog owners, trainers, and handlers. Through the interface, users can connect with others who use the same type of toy and/or training techniques, sharing their experiences, tips, and stories. This sense of community can foster a supportive environment where users can learn from each other, improve training efficacy, and celebrate their dogs' achievements, further enhancing the enjoyment and satisfaction derived from using the toy and training with same.

The adhesives and sealants will now be discussed in greater detail. Adhesives may assist with constructing a durable and secure housing 100, 200, 402 for scent-emitting dog toys. Adhesives may also decrease the likelihood of tampering with the construction of the toy. For example, adhesives may be used to bond various components of the toy together, ensuring a strong and stable structure that can withstand continued use. Adhesives may be selected to provide optimal bonding performance, resistance to wear and tear, and compatibility with the materials used in the toy's construction. Examples of suitable adhesives include epoxy, cyanoacrylate, acrylic, and/or other adhesives that would be apparent to a person of skill in the art after having the benefit of this disclosure.

In some embodiments, sealants may be used to increase protection from moisture and ensure the scent-providing solutions remain securely contained within the housing. By sealing seams, joints, and openings, sealants help to create a barrier that substantially prevents outdoor contaminants from entering the toy and damaging its internal components. This can be particularly important in the case of water-resistant toys, as they may need to be able to withstand exposure to wet conditions without compromising the integrity of the scent material and/or housing.

In one embodiment, the sealant may at least partially include polyurethane. This flexible and durable material may offer adhesive properties with high efficacy, making it suitable for bonding a wide range of substrates. Embodiments using polyurethane may provide water-resistant qualities to create a moisture barrier, ensuring that the toy remains protected in various environments. Polyurethane sealants may also be resistant to wear, contributing to the toy's overall longevity and performance.

Other types of sealants that may be employed in the creation of scent-emitting dog toys include silicone, latex, and butyl rubber. Each of these sealants offers its unique properties and advantages, such as flexibility, durability, and resistance to environmental factors such as heat. By selecting the most appropriate sealant for the toy's definable requirements, manufacturers can ensure that the scent-providing solutions are securely contained and that the toy remains functional and enjoyable for dogs, even in challenging conditions.

The geo-location features will now be discussed in greater detail. The incorporation of a geo-location feature in conjunction with the identification marker on a toy enabled by this disclosure may significantly enhance the play experience for both the dog and their trainer, handler, or other user. This innovative combination may advantageously allow users to track the location of the toy in real-time, making it easier to locate and retrieve during play and training sessions, particularly in outdoor settings.

In an embodiment, to utilize the geo-location feature, pet owners may scan the identification marker, such as a barcode or QR code 400, on the toy using a compatible smartphone or device capable of operating the interactive interface. This action may associate the toy with an interactive interface, which may include a map or other visual representation of the current location of the toy. By accessing this interface, pet owners can monitor the whereabouts of the toy and retrieve it more easily, even in situations where it might become lost or obscured from view.

In an alternative embodiment, the identification marker may comprise a set of alphanumeric characters that may be manually entered into a compatible smartphone or device capable of operating the interactive interface.

In addition to helping pet owners locate the toy during play, the geo-location feature can also serve as a valuable training tool. For example, dog trainers and handlers can use the feature to set up scent-tracking exercises or games that challenge their dog's abilities to locate the toy based on its scent alone, such as are discussed above, without limitation. By monitoring the dog's progress through the interactive interface, handlers can assess their dog's performance, identify areas for improvement, and adapt training techniques as needed.

Furthermore, the geo-location feature can enhance the social aspect of using the scent-emitting dog toy. Pet owners can share the progress, achievements, and experiences of their dogs with other users in the community, fostering a sense of camaraderie and friendly competition. The interactive interface may even offer the option to create location-based challenges, events, or meetups, where users can bring their dogs together to participate in scent-tracking games and activities.

The interactive interface will now be discussed in greater detail. FIGS. 6-29 highlight examples of the interactive interface, which may also be shown in other figures. While various screens provided by the interactive interface are illustrated through FIGS. 6-29, those of skill in the art will appreciate additional features and functionalities after having the benefit of this disclosure. Such features and functionalities are intended to be included within the scope of the following disclosure. The interactive features, along with other features discussed throughout this disclosure, may be operated using a computerized device, such as described in the example below.

Figure 5:
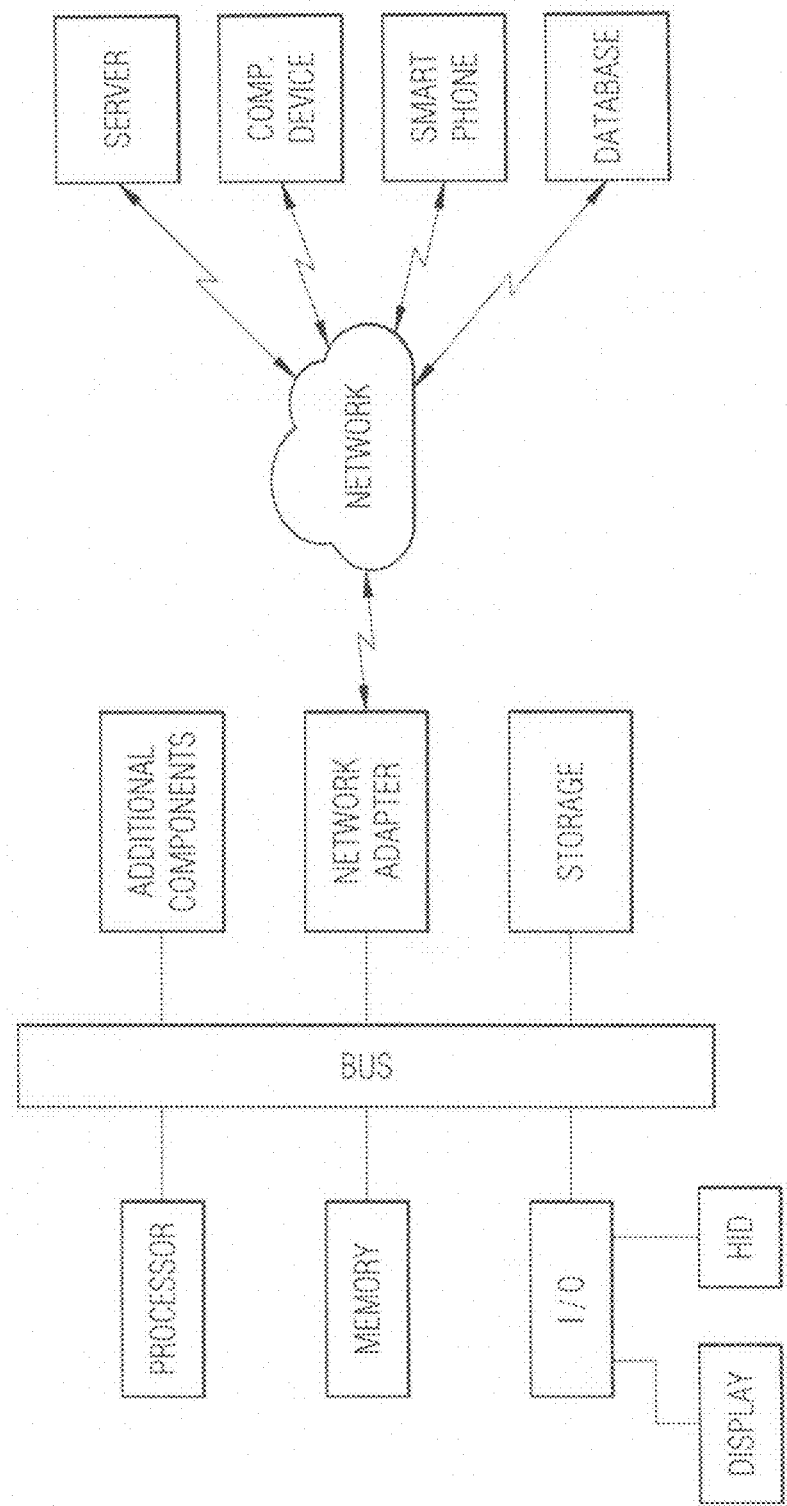
FIG. 5 is a block diagram view of an illustrative computerized device upon which an interactive interface may be operated, according to an embodiment of this disclosure.

Referring now to FIG. 5, an illustrative computerized device will now be discussed in greater detail, without limitation. The computerized device may include a processor, memory, network controller, and optionally an input/output (I/O) controller. Skilled artisans will appreciate additional embodiments of a computerized device that may omit one or more of the aforementioned components or include additional components without limitation. The processor may receive and analyze data. The memory may store data, which may be used by the processor to perform the analysis. The memory may also receive data indicative of results from the analysis of data by the processor.

The memory may include volatile memory modules, such as random-access memory (RAM), or non-volatile memory modules, such as flash-based memory. Skilled artisans will appreciate the memory to additionally include storage devices, such as, for example, mechanical hard drives, solid state data, and removable storage devices.

The computerized device may also include a network controller. The network controller may receive data from other components of the computerized device to be communicated with other computerized devices via a network.

The communication of data may be performed wirelessly. More specifically, without limitation, the network controller may communicate and relay information from one or more components of the computerized device, or other devices and/or components connected to the computerized device, to additional connected devices. Connected devices are intended to include data servers, additional computerized devices, mobile computing devices, smart phones, tablet computers, and other electronic devices that may communicate digitally with another device. In one example, the computerized device may be used as a server to analyze and communicate data between connected devices.

The computerized device may also include an I/O interface. The I/O interface may be used to transmit data between the computerized device and extended devices. Examples of extended devices may include, but should not be limited to, a display, external storage device, human interface device, printer, sound controller, or other components that would be apparent to a person of skill in the art. Additionally, one or more of the components of the computerized device may be communicatively connected to the other components via the I/O interface.

The components of the computerized device may interact with one another via a bus. Those of skill in the art will appreciate various forms of a bus that may be used to transmit data between one or more components of an electronic device, which are intended to be included within the scope of this disclosure.

The computerized device may communicate with one or more connected devices via a network. The computerized device may communicate over the network by using its network controller. More specifically, the network controller of the computerized device may communicate with the network controllers of the connected devices. The network may be, for example, the internet. As another example, the network may be a WLAN. However, skilled artisans will appreciate additional networks to be included within the scope of this disclosure, such as intranets, local area networks, wide area networks, peer-to-peer networks, and various other network formats. Additionally, the computerized device and/or connected devices may communicate over the network via a wired, wireless, or other connection, without limitation.

In operation, a method may be provided for entertaining and training dogs using a toy or other device, which may be supplemented by a companion interactive platform. Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

In an embodiment, a game may include a decoy dog toy device and a dog toy odor device which emits a scent. The first step of said game may be for the handler to hold the decoy dog toy odor device in one hand and to hold the scent-emitting dog toy odor device in the other hand. The handler may then signal to the dog to begin searching for the device; e.g., by saying "Find it." Next, the dog may touch their nose or paw to the dog toy odor device that emits a scent. When the dog touches the dog toy odor device that emits a scent, not the decoy device, then the dog may receive a reward. The reward may constitute a high value treat. Rewards as contemplated herein may include but are not limited to meats or cheeses. Ultimately, the handler may mix up the toys in their hands and repeat the steps.

In another example of a game utilizing dog toy odor devices as described herein, a handler may hide a dog toy odor device along a fence line. The handler may then bring the dog in the general vicinity of the fence. The handler may then signal to the dog to begin searching for the device; e.g., by saying "Find it." Once the dog finds the dog toy odor device, the handler may then give the dog a reward. The handler may move the dog toy odor device and repeat the steps. The handler may increase the difficulty of the game by starting the dog further from the vicinity of where the dog toy odor device is hidden.

In another embodiment of a game as contemplated herein, a handler may hide a dog toy odor device in a dog park. Then, the handler may bring the dog to the general vicinity of the device. The handler may then signal to the dog to begin searching for the device; e.g., by saying "Find it." Once the dog finds the dog toy odor device, the handler may then give the dog a reward. The handler may move the dog toy odor device and repeat the steps. The handler may also increase the difficulty of the game by starting the dog further from the vicinity of where the dog toy odor device is hidden.

In another embodiment of a game as contemplated herein, a handler may hide both a dog toy odor device and a decoy dog toy odor device in a dog park. Then, the handler may bring the dog to the dog park. The handler may then signal to the dog to begin searching for the device; e.g., by saying "Find it." Once the dog finds the dog toy odor device, not the decoy, the handler may then give the dog a reward. The handler may increase the difficulty of the game by starting the dog further from the vicinity of where the dog toy odor device is hidden.

Another game as contemplated herein may involve one or more decoy devices and one or more genuine dog toy odor devices situated linearly. A treat may be placed in the decoy devices. Then, the handler may signal to the dog to search by saying "Find it" for example. Once the dog locates a genuine dog toy odor device, the handler may then give the dog a reward. The handler may then re-arrange the order of the genuine and decoy devices.

In an additional embodiment of a game as contemplated herein, a handler may place a treat in a decoy dog toy device. Then, the handler may hide the scent emitting dog toy odor device and the decoy dog toy (which has the treat inside). Next, the handler may bring the dog to the general vicinity of where the dog toy devices are hidden. Then, the handler may signal to the dog to search by saying "Find it" for example. The handler should not let the dog eat the treat that is inside of the decoy dog toy device. Once the dog finds the genuine dog toy odor device, the handler may then give the dog a reward. The handler may move the devices and repeat the steps. The handler may also increase the difficulty of the game by starting the dog further from the vicinity of where the dog toy odor device is hidden.

In another example of a game, a handler may place an article that emits a human scent into a dog toy device. Such article that emits a human scent may include but is not limited to a piece of human clothing. The handler may place the article that emits a human scent into a dog toy device. The handler may also have an odorless or empty decoy dog toy device. Then, the handler may hold the decoy device in one hand and the human scent-emitting dog toy device in the other hand. Next, the handler may signal to the dog to search by saying "Find it" for example. Once the dog touches their nose or paw to the human scent-emitting dog toy device, the handler may then give the dog a reward. The handler may then switch the toys in their hands and repeat the steps.

A handler and their dog may use the dog toy odor device for either outdoor or indoor scent training or entertainment. In one embodiment, a sealed container with an internal odor mixture may be located within the toy. The odor may escape into the air for the dog to smell without the mixture being contaminated by outside sources via apertures included by the housing and/or lid of the dog toy odor device. In some embodiments the aperture opening size may range from 25 mm to 10 microns, without limitation. The apertures may be any size that allows for the functioning of the dog toy odor devices in a manner contemplated or is otherwise consistent with this disclosure. In lieu of apertures, scents may be emitted by a sieve, a woven mesh material, net material, perforated sheet, odor permeable film, odor permeable polyethylene, or another material with an odor permeable membrane.

In an embodiment, a handler may mark a dog toy odor device with an identification mark. Another person may then hide the device and mark on a map the general vicinity of where the device was hidden by notating the map with the identification mark. The handler may review the map to find the general location where the device was placed. Once the handler arrives at the general location of the dog toy odor device, the handler may use the dog to find the toy. In an embodiment, the handler may also attempt to locate the dog toy in tandem with the dog.

An illustrative method of training an animal to detect an odor may be provided, without limitation. A first step of the illustrative method may include providing an animal toy odor device. In this step, the device may include a housing comprising one or more apertures, a geo-locator aspect, and an odor carrier, which odor carrier may comprise a chamber comprising a composition emitting an odor detectable by an animal. A second step of the illustrative method may include positioning the animal toy odor device at a defined location. A third step of the illustrative method may include providing an electronic map communicatively connected with the geo-locator aspect. A fourth step of the illustrative method may include manually guiding the animal within a definable distance of the animal toy odor device. A fifth step of the illustrative method may include ceasing manual guidance of the animal and allowing the animal an opportunity to locate the animal toy odor device, either on its own or with the assistance of the dog's handler.

In one embodiment, the method may be used with a housing that includes a protective coating. In one embodiment, the method may further relate to use of a coating material that my include but is not limited to polyurethane, natural rubber, thermoplastic rubber (TPR), nylon, or polyvinyl chloride (PVC).

In one embodiment, the method may further include a time limit to perform the steps of the illustrative method discussed above. Timed sessions can add an exciting and challenging dimension to the scent detection game and training exercises, providing an additional layer of engagement for both dogs and their owners. In these versions of the game and training exercises, participants may be given an allotted time frame within which their dog must locate the scent-emitting toy. The timed aspect of the game may encourage dogs to hone their scent detection skills and work more efficiently in their pursuit of the hidden toy.

The inclusion of timed sessions in the game can facilitate friendly competition among participants, as users can compare their dogs' performance based on the speed with which they locate the hidden toy. Leaderboards can be used to display the quickest times, creating a sense of rivalry and motivation for users to improve their dogs' abilities and climb the rankings. These timed competitions can foster a sense of camaraderie among participants, who can share tips, advice, and experiences, further enhancing the overall enjoyment of the game.

Moreover, timed sessions can be customized to accommodate various skill levels and preferences. For example, beginners may opt for longer time frames to allow their dogs ample opportunity to locate the toy and develop their scent tracking skills. As their dogs' abilities improve, users can choose to participate in more challenging timed sessions, pushing their dogs to excel and further refine their scent detection capabilities. This flexibility ensures that the game remains accessible and enjoyable for a wide range of participants, regardless of their dogs' current skill levels.

In one embodiment, the interactive interface associated with the scent-emitting dog toy may offer features designed to enhance the user experience, including competition tracking. In embodiments including this feature, pet owners may monitor their dog's progress and performance in the game, as well as compare their results to those of other participants. By providing an accessible and user-friendly means of tracking competition results, the interactive interface helps to create a more engaging and enjoyable experience for both dogs and their owners.

Competition tracking can be tailored to suit the individual preferences and needs of each user, ensuring that the feature is both relevant and valuable. For those who enjoy the social and competitive aspects of the game, the competition tracking feature can offer an exciting way to stay connected with fellow participants and strive for improvement. On the other hand, users who prefer a more casual and relaxed play experience can choose not to engage with the competition tracking feature, focusing solely on the enjoyment and bonding opportunities provided by the game.

Furthermore, the competition tracking feature can be adapted to accommodate various types of events and challenges. For instance, users can track their dog's performance in timed scavenger hunts, leaderboard rankings, or even head-to-head matches against other players. The interactive interface can also display historical data, allowing users to monitor their dog's progress over time and identify areas for improvement. By offering a flexible and customizable competition tracking feature, the interactive interface caters to the diverse interests and goals of its users.

In one embodiment, users could be provided an option to rent out their yards for other players to use. This unique opportunity provides a way for pet owners to monetize their outdoor space while offering a valuable resource to fellow game participants. Operators of the platform may additionally generate revenue by retaining a portion of the rental fees. By renting their yards, users can create a diverse range of hiding spots and challenges, thereby contributing to the dynamic and engaging nature of the game.

In one example, the process of renting one's yard for the game could be facilitated through the interactive interface platform, through which users can list their yards on the platform, providing essential details such as location, size, available dates and times, and any definable features or amenities that may be of interest to potential renters. Additionally, users can set their own rental fees, allowing them to tailor their offerings to suit their preferences and local market conditions.

This yard rental platform could be designed to ensure a seamless and secure experience for both renters and yard owners. Similar to well-established rental services, the platform can incorporate features such as user profiles, ratings, and reviews to help build trust among participants. Renters can browse available yards based on criteria such as location, price, and user ratings, ensuring that they find a space that suits their needs and preferences. Meanwhile, yard owners can vet potential renters by reviewing their profiles and past experiences, giving them confidence in their decision to rent out their space.

To facilitate user engagement, the interactive interface may be adapted to specific locations such as, without limitation, public and private dog parks, indoor dog parks, and other locations suitable for carrying out games and training exercises of the nature discussed herein.

To facilitate user engagement, information regarding how to play games and conduct training exercises as described herein may be posted at public and private dog parks, indoor dog parks, and other outdoor and indoor locations suitable for carrying out games and training exercises of the nature discussed herein regarding how to use the dog toy odor devices and the interactive interface.

In an embodiment of the systems described herein, the dog toy odor devices may include a barcode or QR code, wherein when a user scans the barcode or QR code, advertisements from local businesses may be presented to the user through the interactive interface.

In at least one embodiment, the interactive interface may feature a leaderboard, allowing pet owners to track their dog's performance in comparison to others in the community. Participants can earn points or rankings based on the speed and accuracy with which their dogs locate the hidden toy. This friendly competition can serve as an incentive for pet owners to continue training their dogs and improving their scent detection skills. Additionally, the leaderboard can create a sense of camaraderie among users, fostering a supportive and enthusiastic community of dog lovers.

In at least one embodiment, the interactive interface may integrate the game or training activity with a social profile and network designed for dog owners. This platform could allow users to connect with fellow pet owners, share their dogs' achievements, exchange tips and advice, and even arrange playdates or meetups. By creating a social network centered around the scent detection game, the experience becomes more engaging and enjoyable, fostering a sense of belonging and community among participants.

In an embodiment, the interactive interface may incorporate a library of training videos, such as via a streaming platform, which may demonstrate various techniques and strategies for improving scent detection skills. These videos, which may be created by experienced dog trainers, other users, or, more generally, anyone having sufficient know-how regarding dog training, can serve as valuable resources for pet owners looking to enhance their dogs' abilities and performance in the game. Additionally, users can share their own training videos, showcasing their dogs' progress and providing inspiration for others in the community.

In an embodiment, the interactive interface may feature monthly competitions, akin to online poker games, where users can compete for prizes or even monetary rewards. These timed, scavenger hunt-style events can challenge dogs and their owners to locate a series of hidden scent-emitting toys within a definable time frame. In some embodiments, participants can choose to play for fun or opt to compete for money or prizes, adding an extra layer of excitement and motivation to the game.

In an embodiment, the interactive interface may be adapted for indoor environments, such as malls or schools. This variation offers users the opportunity to engage in the game regardless of weather conditions or outdoor accessibility. Indoor hides can present unique challenges and require different strategies, ensuring that the game remains fresh and engaging for both dogs and their owners.

In at least one embodiment, the interactive interface may allow users to hide scent-emitting toys themselves and pin their locations within the system. This feature encourages creativity and collaboration among users, as they can create custom challenges for other participants to tackle. Additionally, it keeps the game dynamic and unpredictable, as new hiding spots can be continuously added and discovered.

In at least one embodiment, the interactive interface may allow users to earn money by hiding scent-emitting toys for others to find, similar to gig economy platforms. This feature provides an incentive for users to engage more deeply in the game and contributes to the overall experience for the entire community.

In at least one embodiment, the interactive interface may facilitate the organization of meetup groups, where users can gather to participate in group scent detection activities. These events can foster social interaction, networking, and friendly competition among dog owners, enhancing the overall enjoyment of the game.

In at least one embodiment, the interactive interface may also include designated areas where scent-emitting toys are hidden, and dogs are encouraged to explore.

Figure 6:
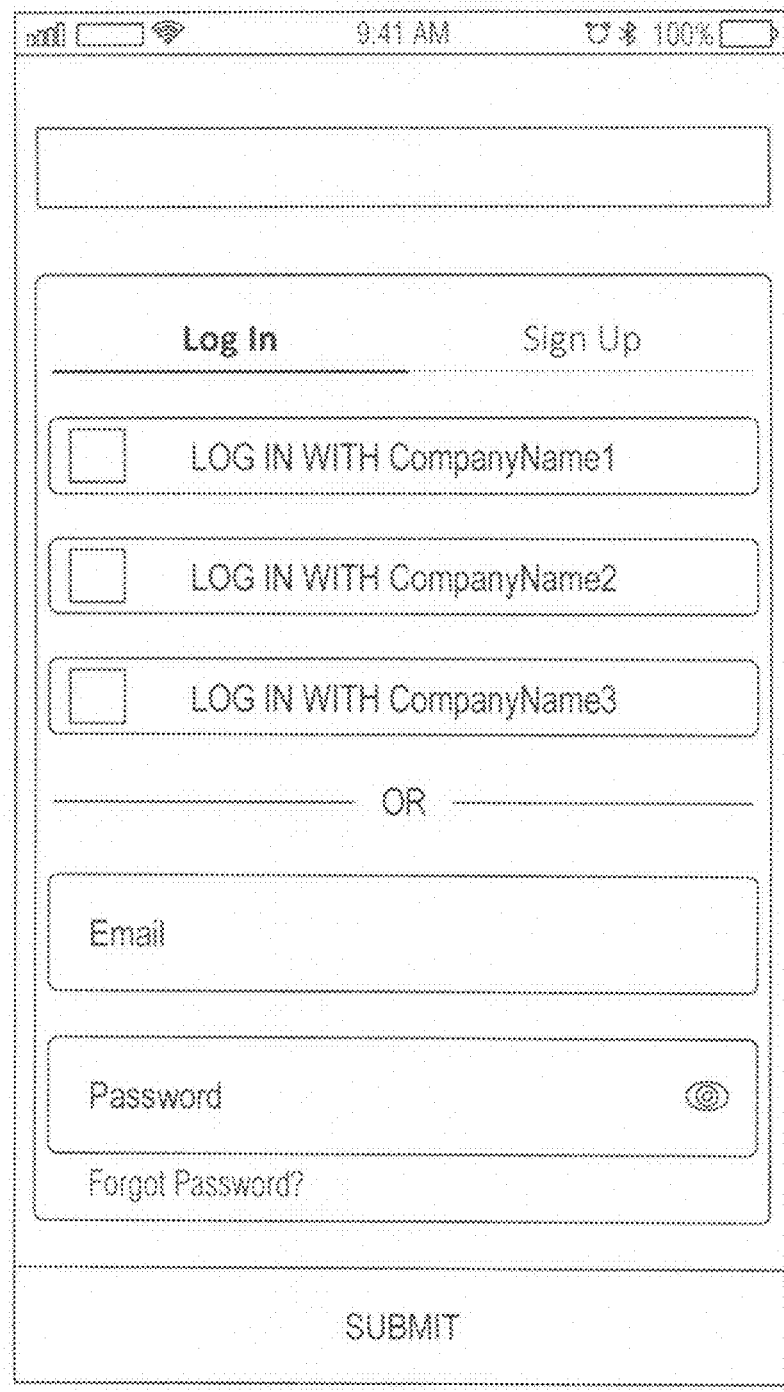
FIG. 6 is a wireframe view of an illustrative display screen provided by an interactive interface, according to various embodiments of this disclosure.
Figure 7:
FIG. 7 is a wireframe view of an illustrative display screen provided by an interactive interface, according to various embodiments of this disclosure.

FIGS. 6-29 will now be discussed further. FIGS. 6 and 7 depict representative log-in screens for a mobile application through which the interactive interface described herein may be accessed.

Figure 8:
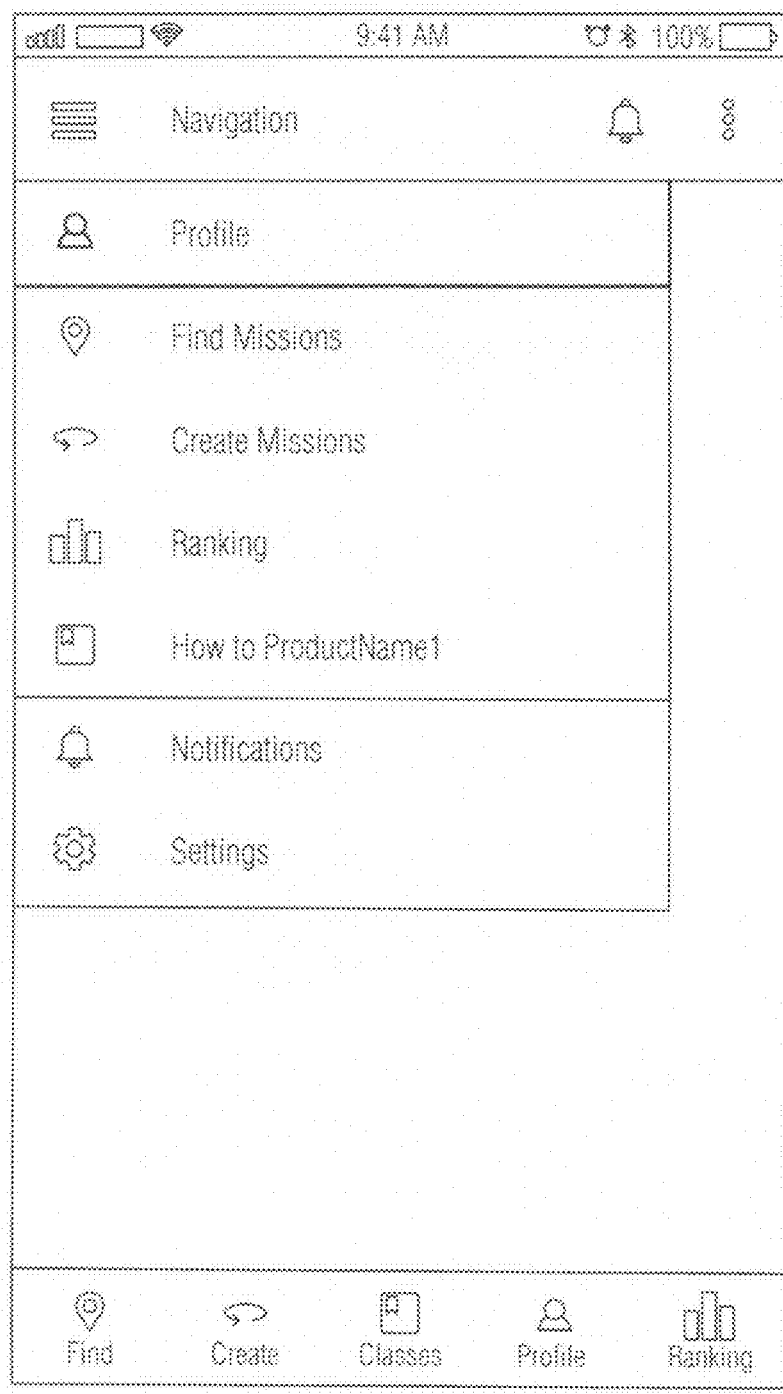
FIG. 8 is a wireframe view of an illustrative display screen provided by an interactive interface, according to various embodiments of this disclosure.

FIG. 8 depicts a representative display screen of an interactive interface as described herein through which several features of the interactive interface may be accessed. As depicted in FIG. 8, users may manipulate this display screen of the interactive interface to access their user profile, find missions, create missions, access their animal's competitive ranking relative to other animals, view notifications, and access and manipulate their user settings.

Along the bottom of the display screen depicted in FIG. 8, as well as FIGS. 9-29, are presented a series of icons that, when selected, may bring the user to a new screen exhibiting different information and/or functionality. These icons allow a user to search for a particular mission (this icon is labeled "Find"); to create a new mission (this icon is labeled "Create"); to view available training classes (this icon is labeled "Classes"); to access the user's profile (this icon is labeled "Profile"); and to view information regarding the relative performance of dogs who have engaged in one or more missions (this icon is labeled "Ranking").

Figure 9:
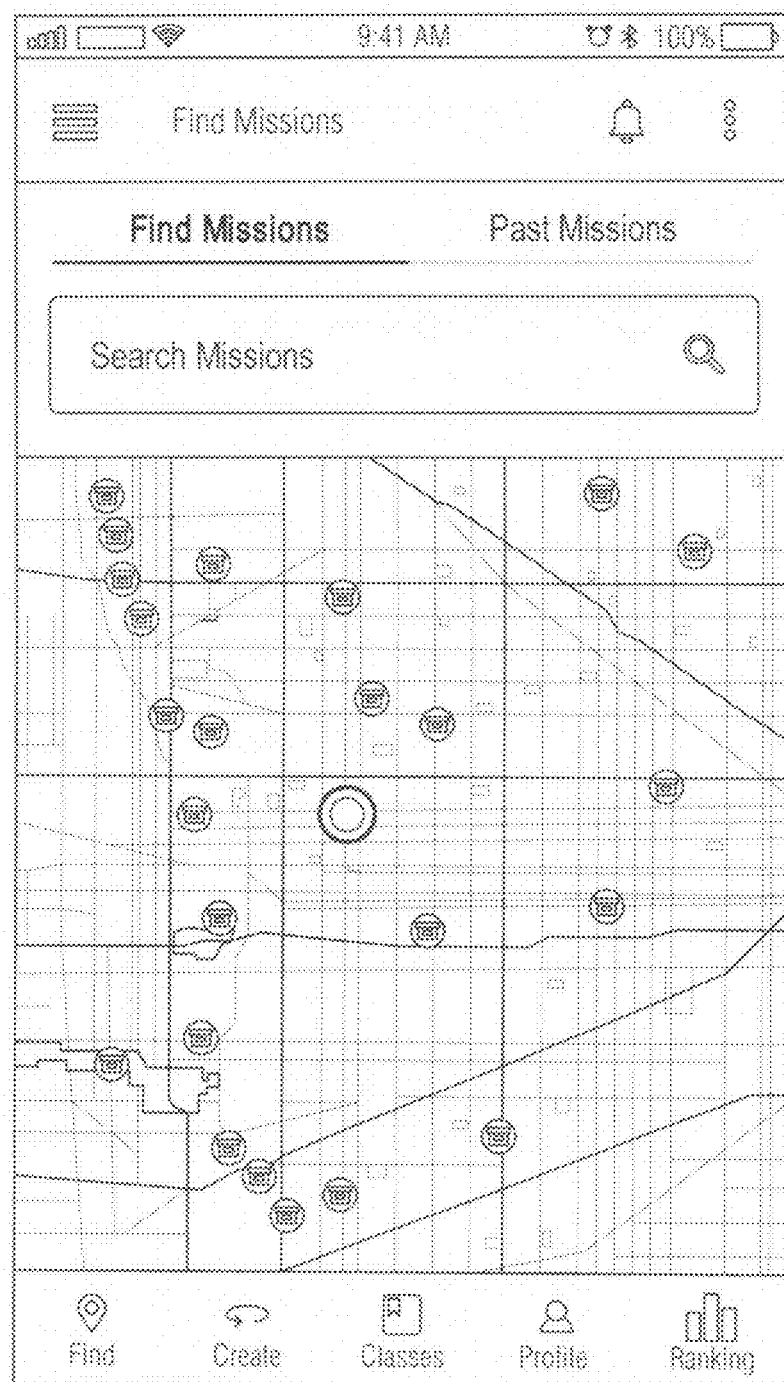
FIG. 9 is a wireframe view of an illustrative display screen provided by an interactive interface, according to various embodiments of this disclosure.

FIG. 9 depicts a representative display screen of the interactive interface through which a user may view available missions. The display screen comprises a map showing a series of icons. The icons are intended to reflect the locations of dog toy odor devices.

Figure 10:
FIG. 10 is a wireframe view of an illustrative display screen provided by an interactive interface, according to various embodiments of this disclosure.

FIG. 10 depicts a representative display screen of the interactive interface wherein the user has selected a particular mission. The display screen comprises a map showing a series of dog toy odor device icons. The specific icon/mission selected by the user appears as a series of concentric circles on the map. Information related to the mission is also displayed on the screen. Such information may include, without limitation, the name of the mission and/or the park where the dog toy odor device has been placed for the selected mission, the distance from the user's current location to the dog toy odor device for the selected mission, and the difficulty level of the mission.

Figure 11:
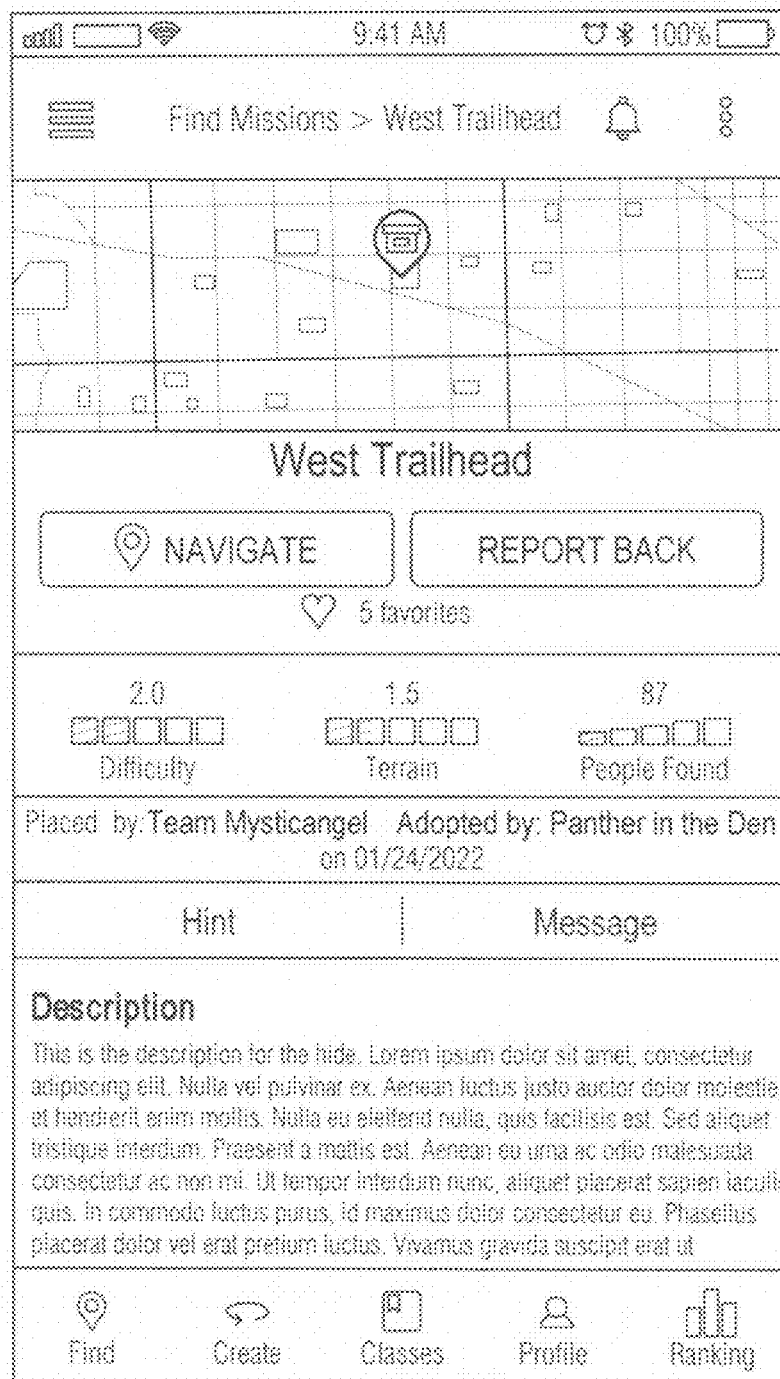
FIG. 11 is a wireframe view of an illustrative display screen provided by an interactive interface, according to various embodiments of this disclosure.

FIG. 11 depicts a representative display screen of the interactive interface showing additional information related to a particular mission. Such information may include, without limitation, the difficulty level of the mission, the nature of the terrain, and the number of users who have successfully completed the mission. A narrative description of the mission may also be displayed. Other pieces of information may likewise be presented to a user through a display screen as shown in FIG. 11, several non-limiting examples of which are shown in said figure.

Figure 12:
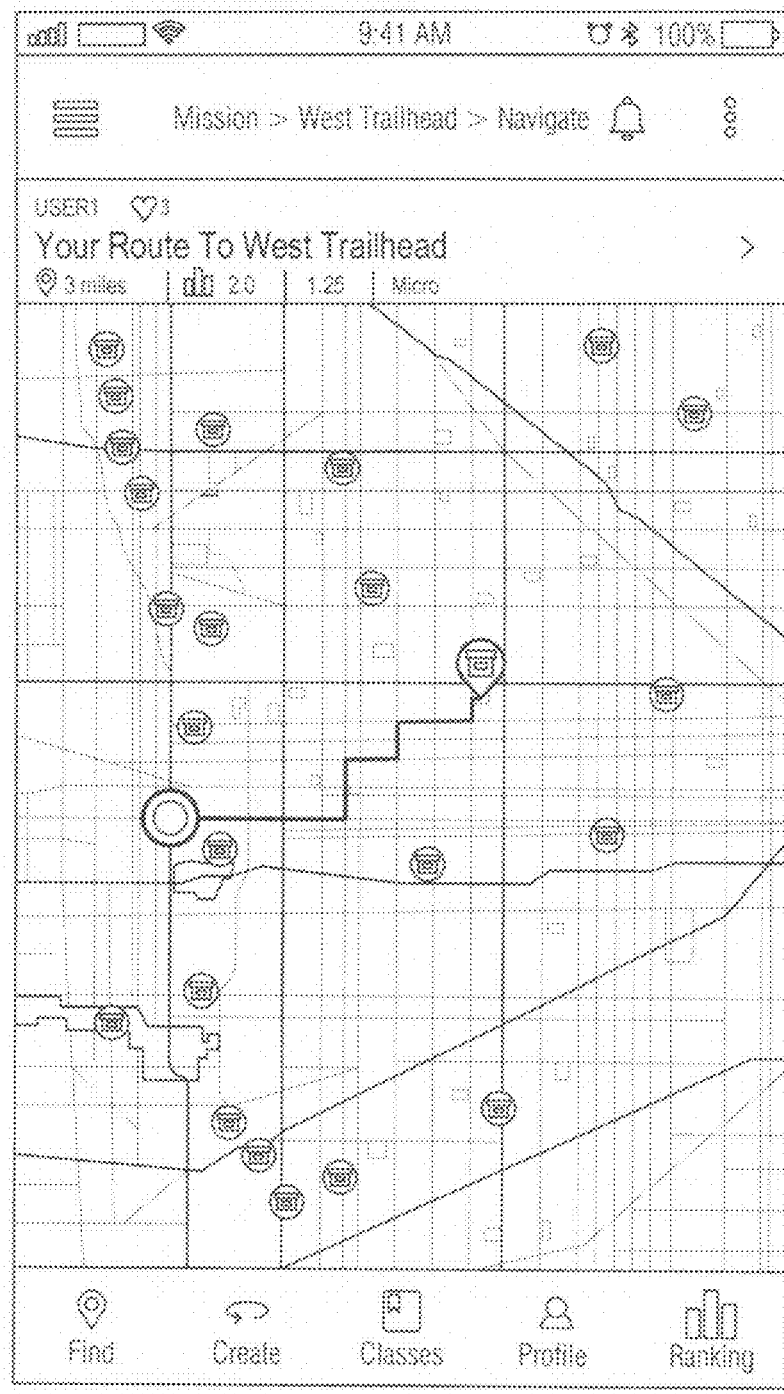
FIG. 12 is a wireframe view of an illustrative display screen provided by an interactive interface, according to various embodiments of this disclosure.

FIG. 12 depicts a representative display screen of the interactive interface as presented to a user who has selected a particular mission. As shown in FIG. 12, upon selecting a particular mission, the display screen will show the user a route from the user's current location to the dog toy odor device associated with the selected mission.

Figure 13:
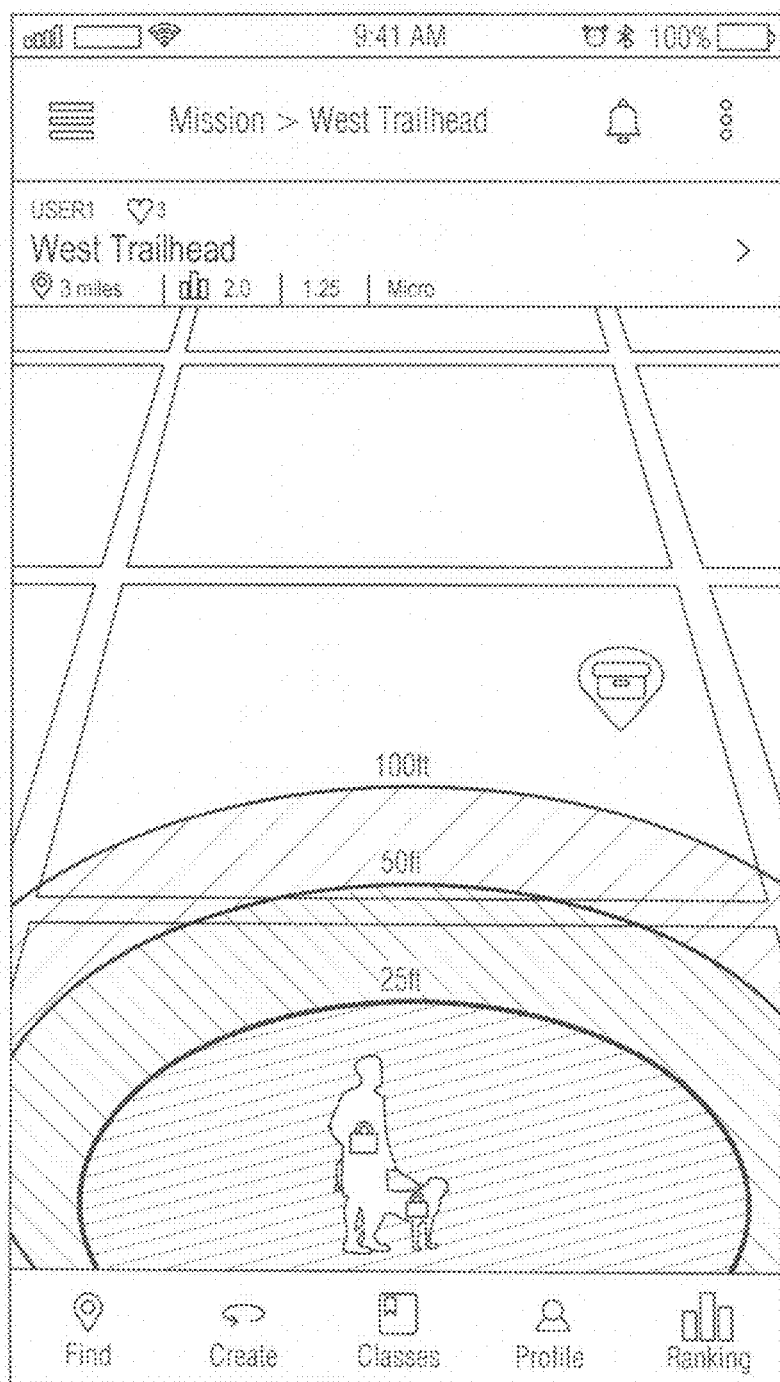
FIG. 13 is a wireframe view of an illustrative display screen provided by an interactive interface, according to various embodiments of this disclosure.

FIG. 13 depicts a representative display screen of the interactive interface as presented to a user who has selected a particular mission. The display screen of FIG. 13 depicts the location of the user and their dog relative to the dog toy odor device for the selected mission. The display screen depicted in FIG. 13 may be presented to the user once the user advances closer to the dog toy odor device to the point where the handler ceases manually guiding the dog.

Figure 14:
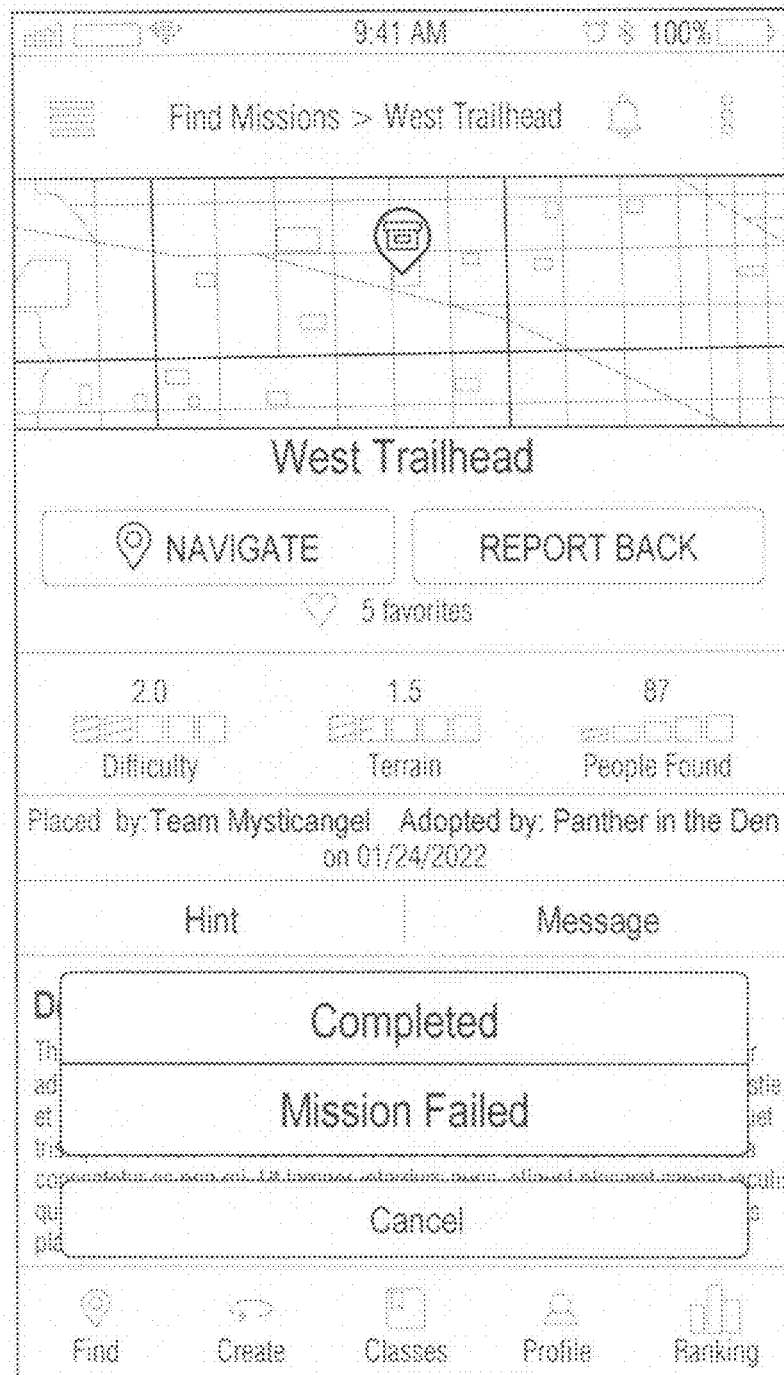
FIG. 14 is a wireframe view of an illustrative display screen provided by an interactive interface, according to various embodiments of this disclosure.

FIG. 14 depicts a representative display screen of the interactive interface as presented to a user who has selected a particular mission. FIG. 14 shows several prompts that appear once the dog toy odor device has been obtained. The user is able to select an option indicating that the mission has been completed or that the mission failed (e.g., if the dog itself never found the dog toy odor device or did not do so within a pre-determined maximum amount of time).

Figure 15:
FIG. 15 is a wireframe view of an illustrative display screen provided by an interactive interface, according to various embodiments of this disclosure.
Figure 16:
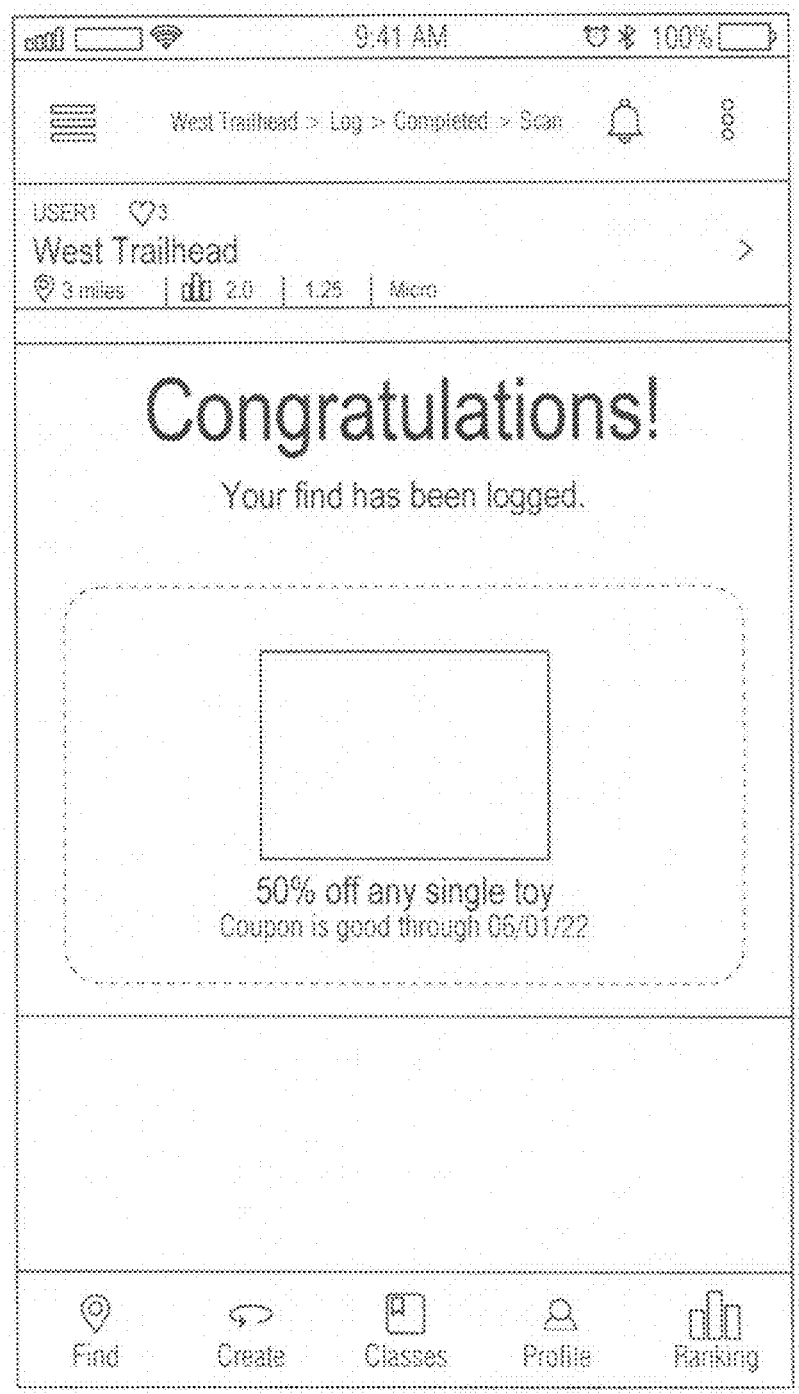
FIG. 16 is a wireframe view of an illustrative display screen provided by an interactive interface, according to various embodiments of this disclosure.
Figure 17:
FIG. 17 is a wireframe view of an illustrative display screen provided by an interactive interface, according to various embodiments of this disclosure.

FIG. 15 depicts a representative display screen of the interactive interface as presented to a user who possesses the dog toy odor device after completing a mission. This display screen contains an outline of a square that a user may line up with a QR code that may be located on the housing unit of the dog toy odor device using a camera on the user's smartphone. Upon doing so, information regarding the results of the mission may be calculated and stored for subsequent retrieval by the user. Such information may include, without limitation, the date of the mission, whether the mission was completed successfully or not, and the amount of time that transpired between when the handler ceased manually guiding the dog and when the dog obtained the dog toy odor device. Upon logging such information regarding the mission, display screens such as those depicted in FIGS. 16 and 17 may be presented to the user. The display screen of FIG. 16 depicts a message confirming that the information related to the mission has been logged. The display screen of FIG. 17 depicts a congratulatory message for having completed a mission.

Figure 18:
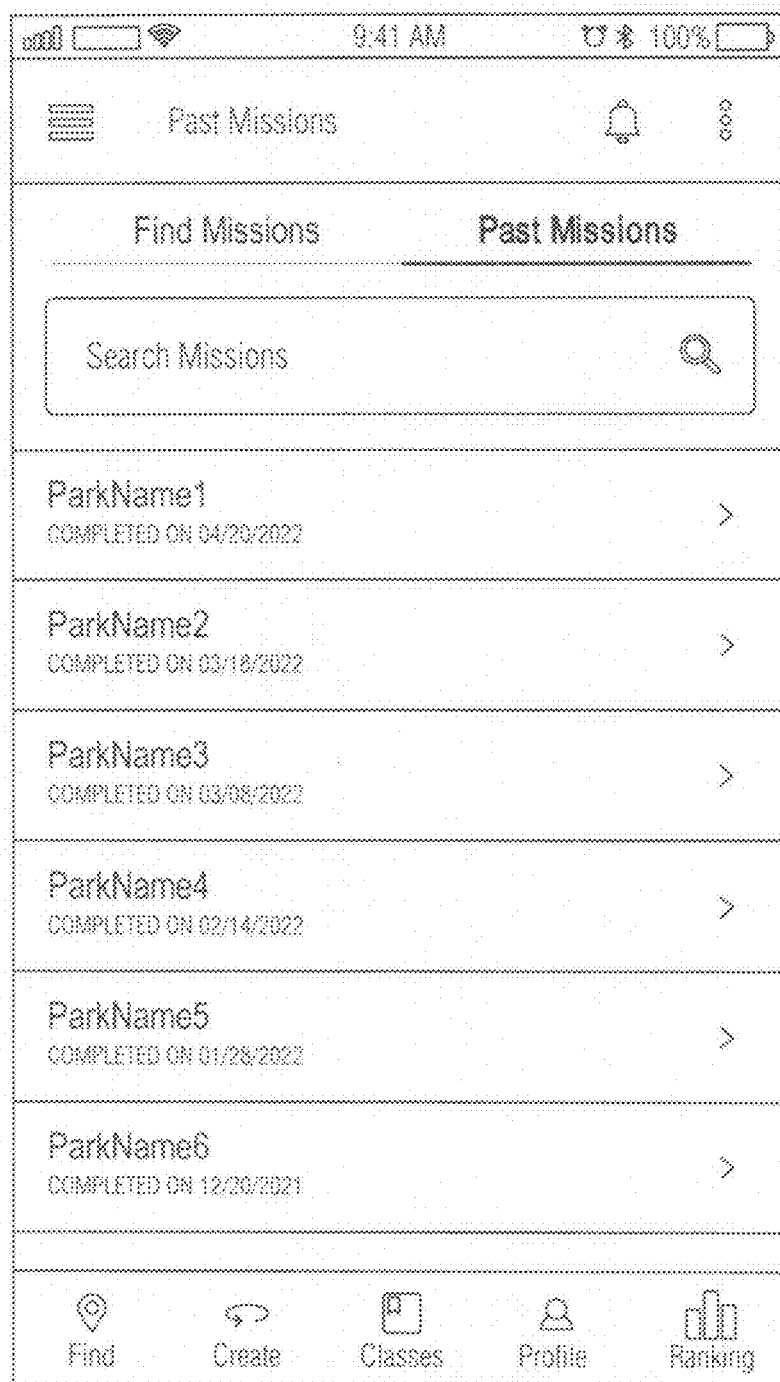
FIG. 18 is a wireframe view of an illustrative display screen provided by an interactive interface, according to various embodiments of this disclosure.

FIG. 18 depicts a representative display screen of the interactive interface as presented to a user showing a list of that user's past missions. Upon selecting a particular past mission from the list, the user may be directed to a new display screen, such as that presented in FIG. 19, which provides additional information regarding that past mission.

Figure 19:
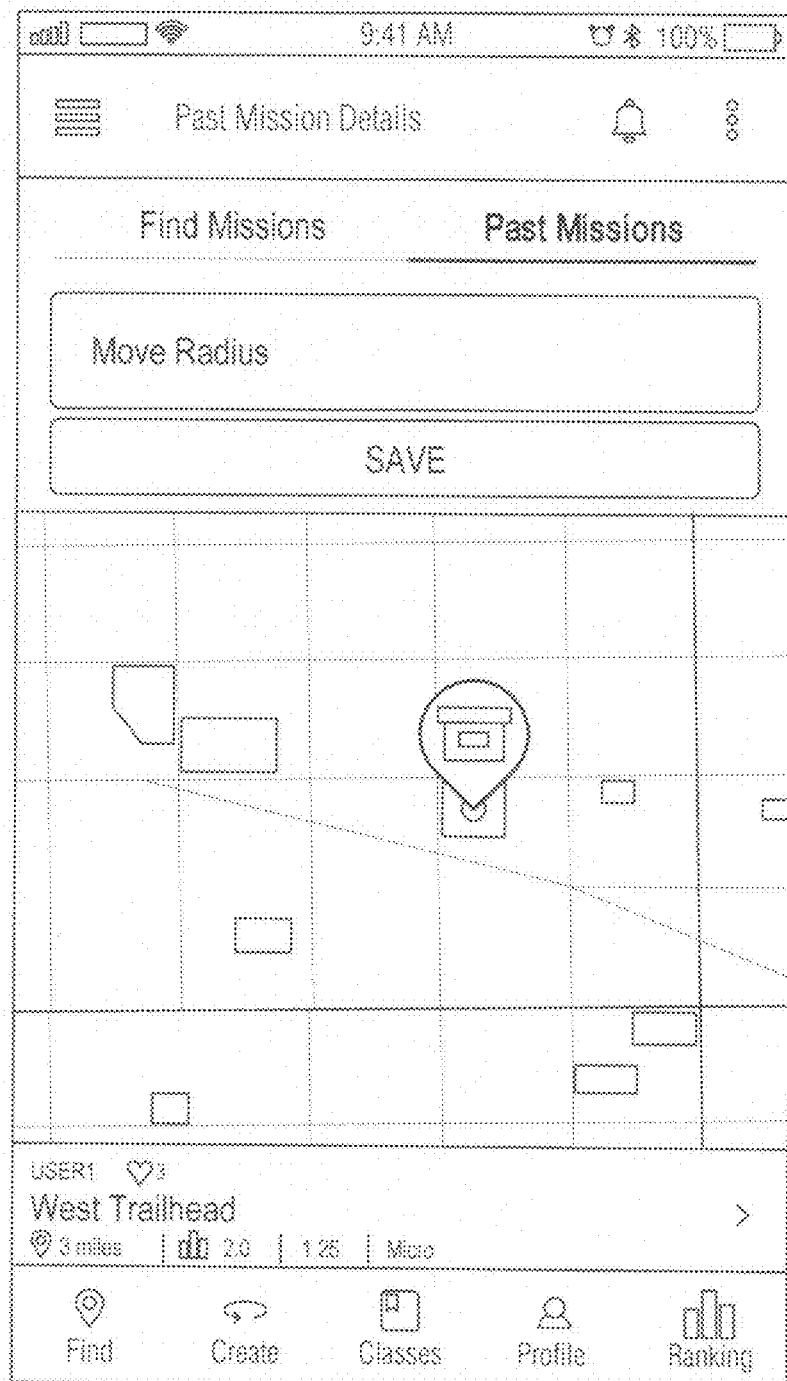
FIG. 19 is a wireframe view of an illustrative display screen provided by an interactive interface, according to various embodiments of this disclosure.
Figure 20:
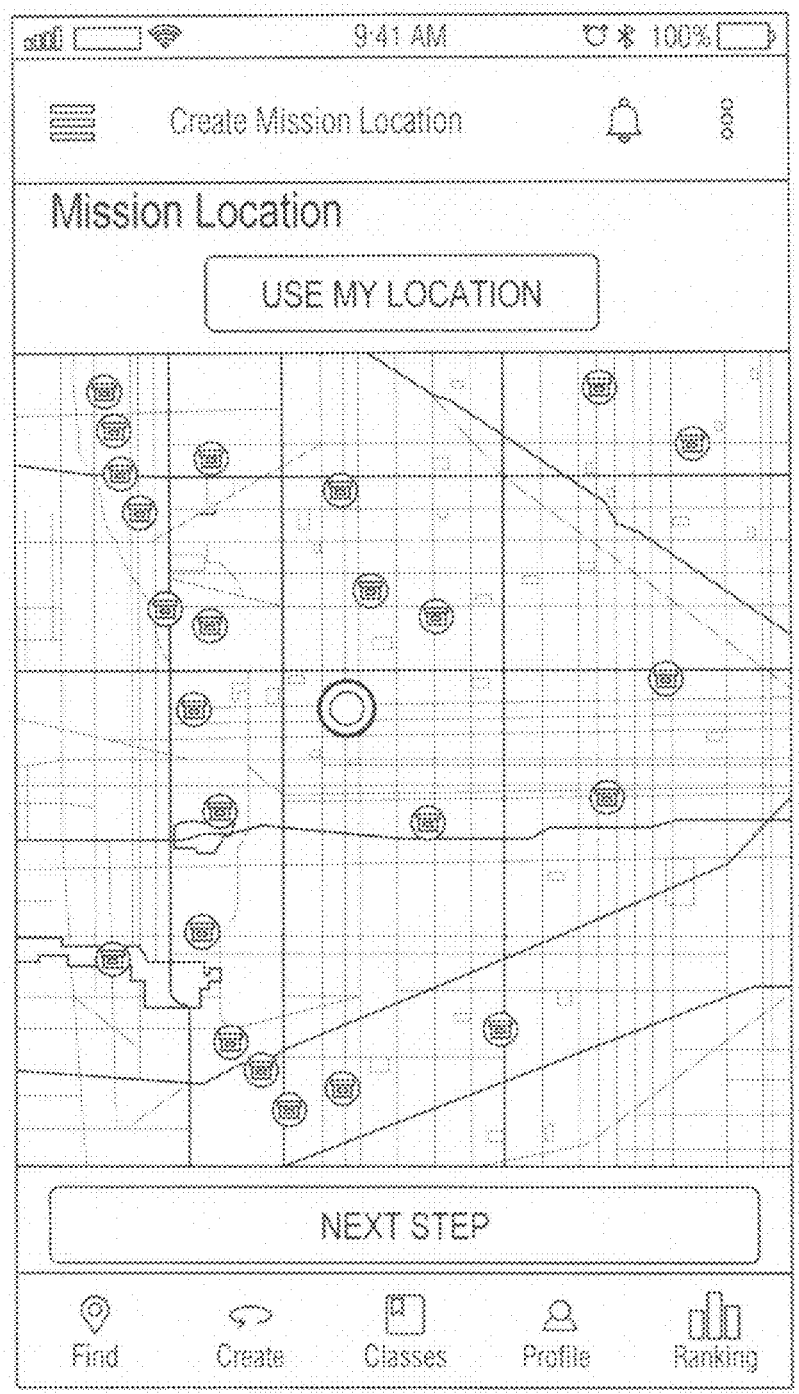
FIG. 20 is a wireframe view of an illustrative display screen provided by an interactive interface, according to various embodiments of this disclosure.
Figure 21:
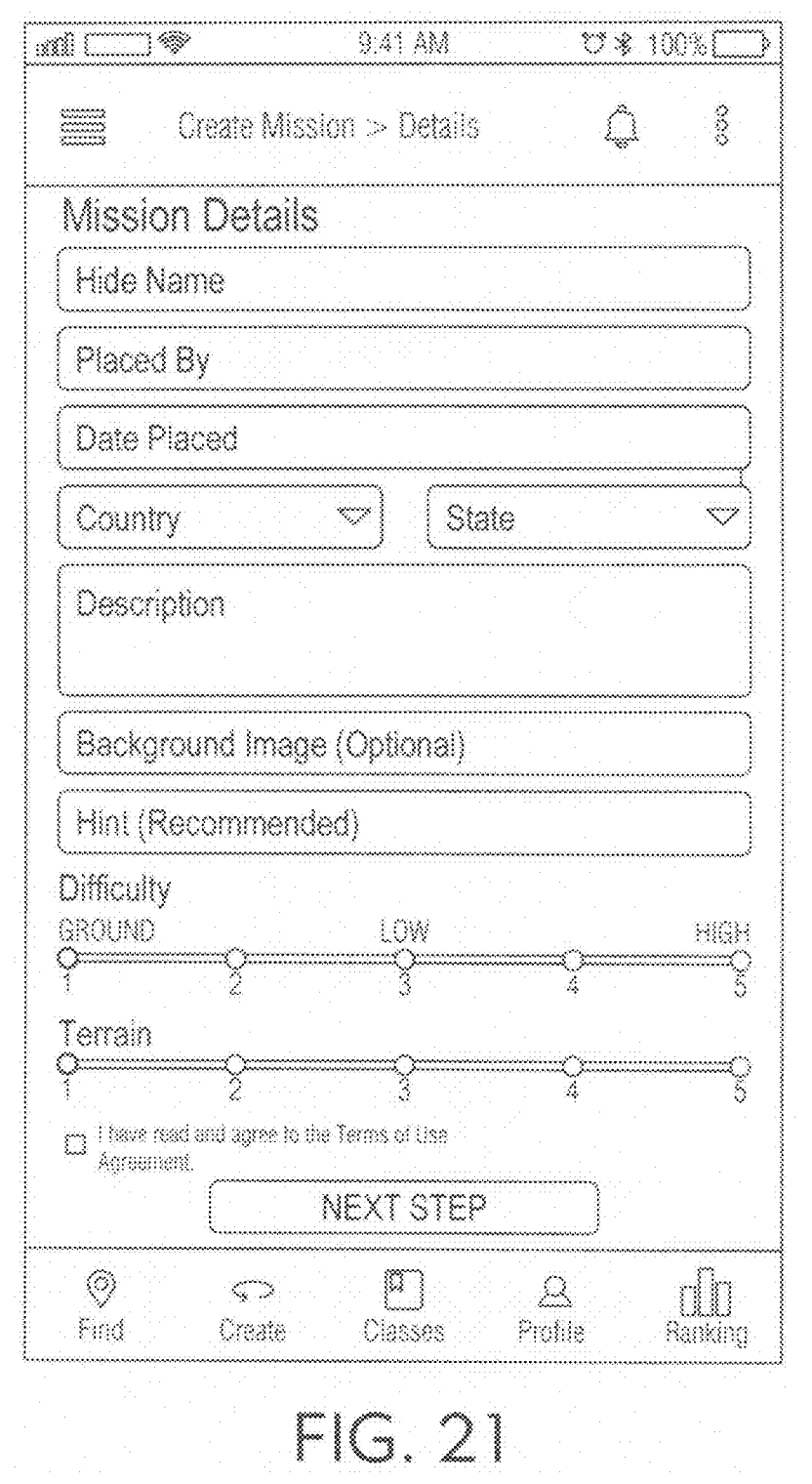
Figure 22:
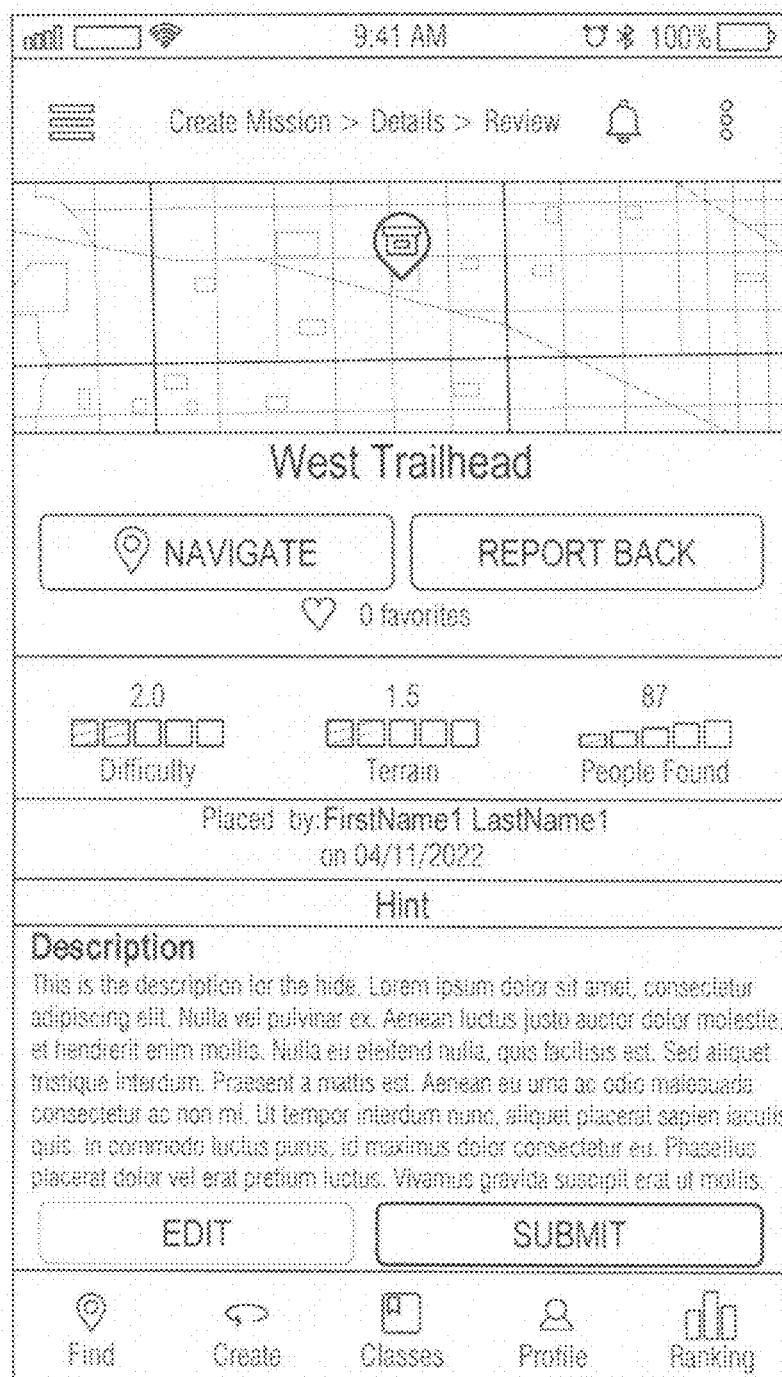
FIG. 22 is a wireframe view of an illustrative display screen provided by an interactive interface, according to various embodiments of this disclosure.

FIGS. 20-22 depict representative display screens of the interactive interface as presented to a user when the user elects to create a new mission themselves. FIG. 19 depicts the first step in this process of creating a new mission, wherein the user may select a location for the mission. FIG. 21 depicts a subsequent display screen that may be presented to such user wherein the user may enter additional details regarding the new mission that he or she wishes to create. Such information may include, without limitation, a name assigned to the mission, the person who is creating the mission, the date on which the mission is being created, a narrative description of the mission, information pertaining to the difficulty of the mission and regarding the terrain where the mission will be located, and other items of information as depicted in FIG. 21. Upon entering the required and optional items of information, the user may be asked to review the details of the mission as created. A non-limiting example of how such a review screen may appear to a user is depicted in FIG. 22.

Figure 23:
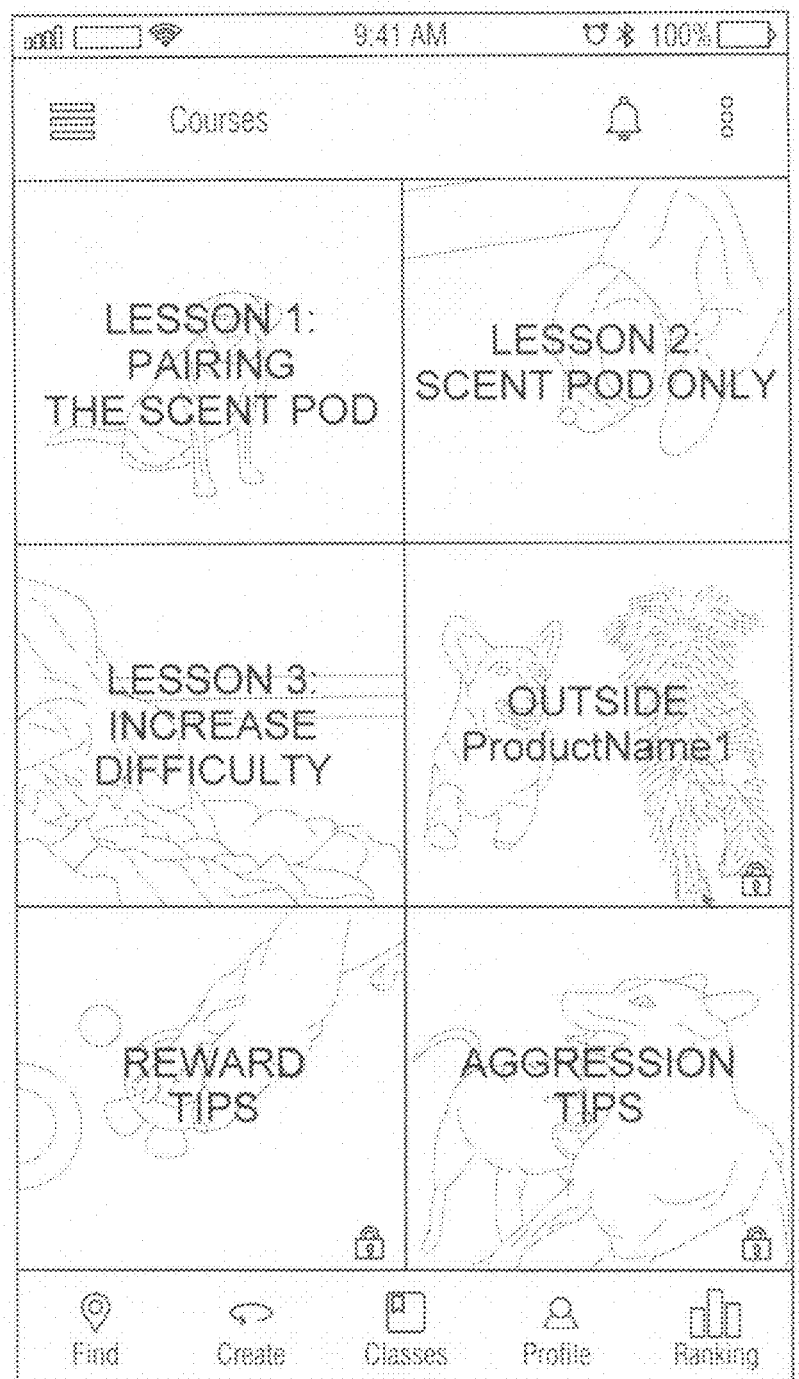
FIG. 23 is a wireframe view of an illustrative display screen provided by an interactive interface, according to various embodiments of this disclosure.
Figure 24:
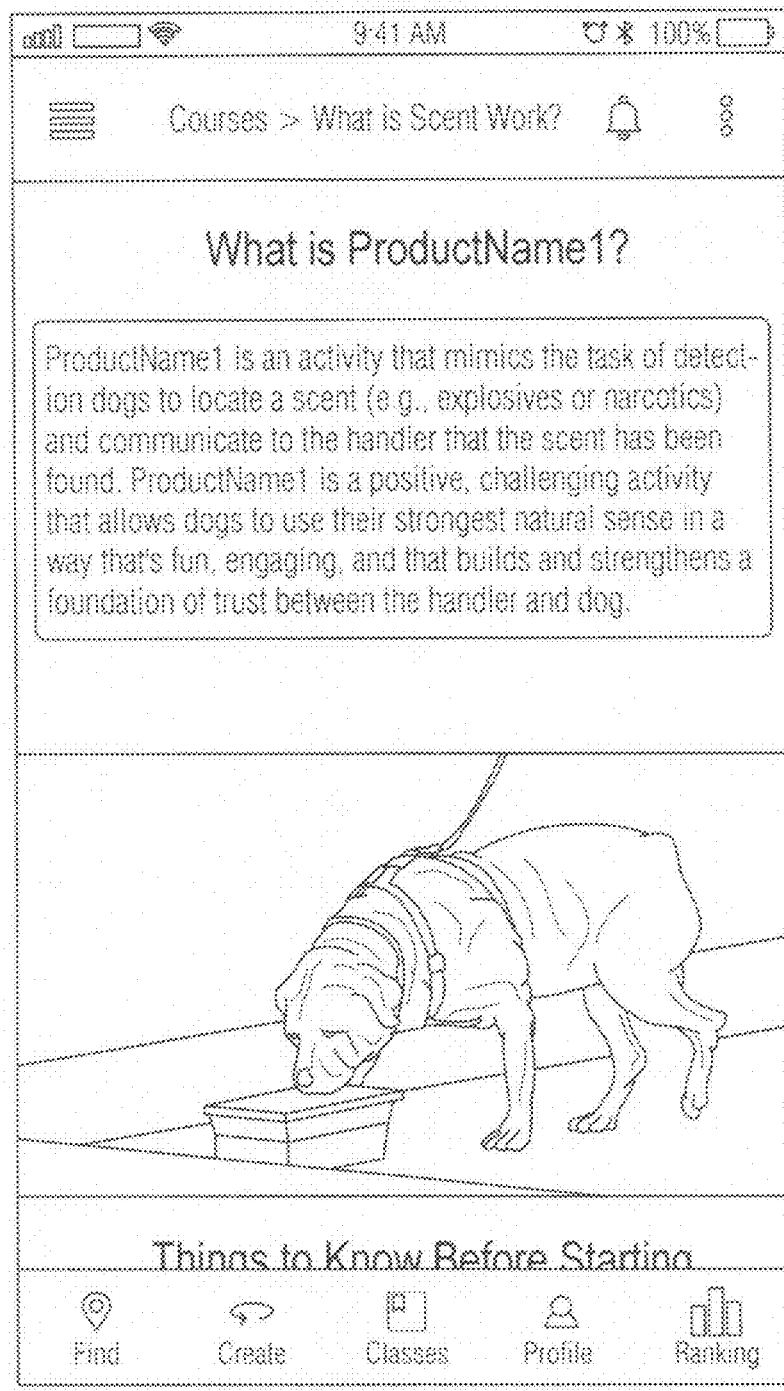
FIG. 24 is a wireframe view of an illustrative display screen provided by an interactive interface, according to various embodiments of this disclosure.

FIG. 23 depicts a representative display screen of the interactive interface as presented to a user when the user has selected the "Courses" icon referenced above. In an embodiment, as shown in FIG. 3, the user may select from among several different courses that provide instruction with regard to how to train a dog using the dog toy odor device and associated systems and methods described herein. Other electronic materials may be accessed through the Courses screen as well, such as, without limitation, any number of specific dog training tips (e.g., utilizing a reward system to incentive a dog to behave as desired; and minimizing aggressive behaviors). FIG. 24 depicts a representative display screen of the interactive interface as presented to a user upon selecting a specific course.

Figure 25:
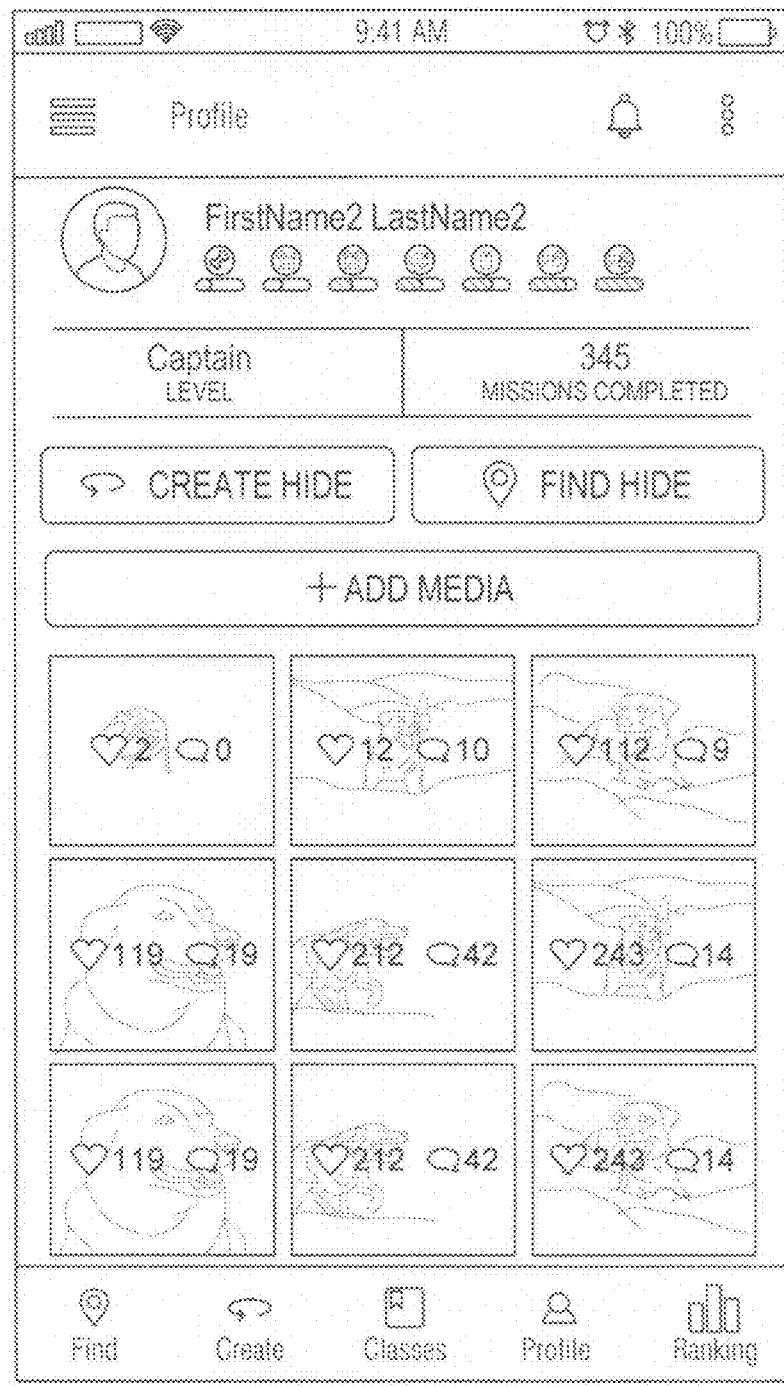
FIG. 25 is a wireframe view of an illustrative display screen provided by an interactive interface, according to various embodiments of this disclosure.

FIG. 25 depicts a representative user profile display screen of the interactive interface as presented to a user. The items of information that may be contained with a user's profile include, without limitation, the user's name, number of missions completed, and the level of progress that this represents (e.g., "Captain" level).

Figure 26:
FIG. 26 is a wireframe view of an illustrative display screen provided by an interactive interface, according to various embodiments of this disclosure.

FIG. 26 depicts a representative display screen of the interactive interface as presented to a user through which the user may enter and/or modify their user profile information. Information pertaining to one or more dogs may be entered through this aspect of the interactive interface component. Such information may include but is not limited to the name of a dog, the breed of the dog, and the age of the dog.

Figure 27:
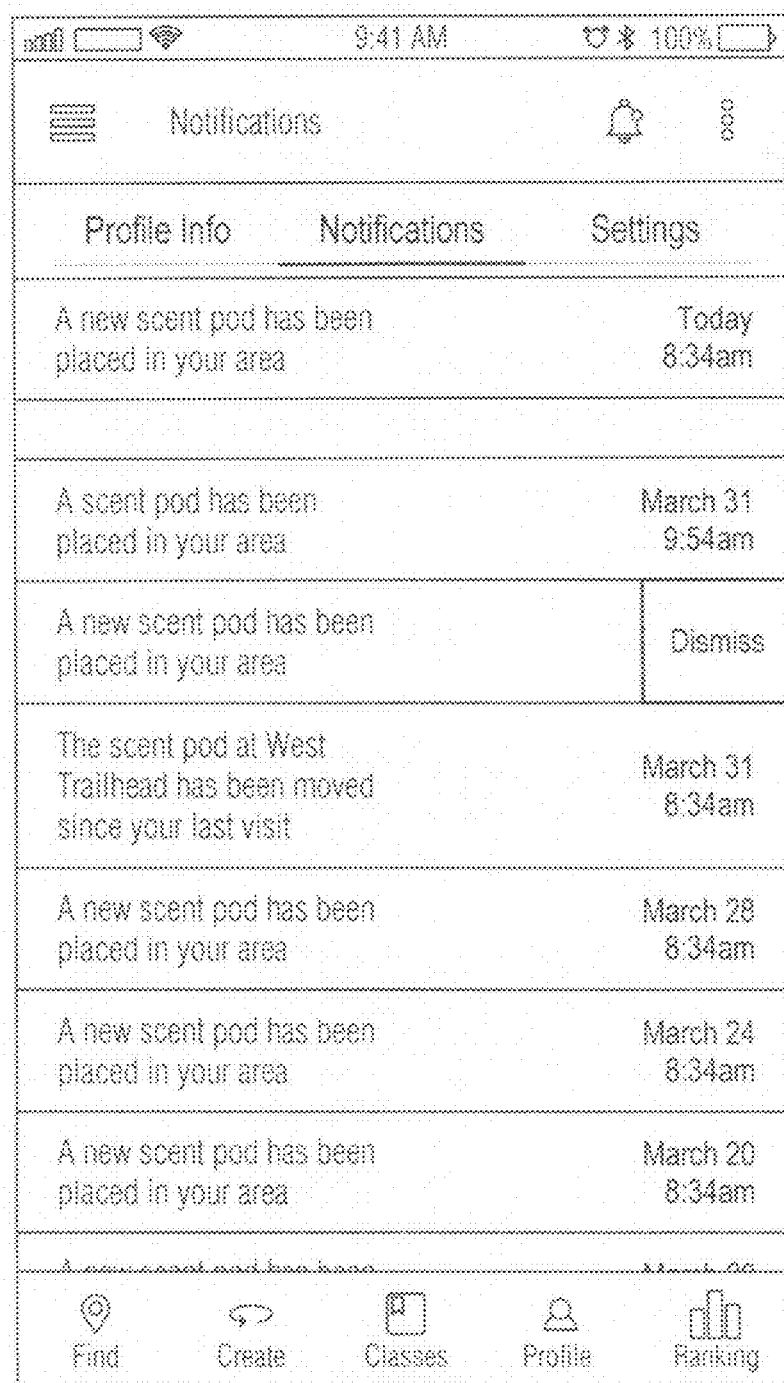
FIG. 27 is a wireframe view of an illustrative display screen provided by an interactive interface, according to various embodiments of this disclosure.

FIG. 27 depicts a representative display screen of the interactive interface as presented to a user showing the notifications sent to the user. In an embodiment, a user may delete or dismiss particular notifications if they wish.

Figure 28:
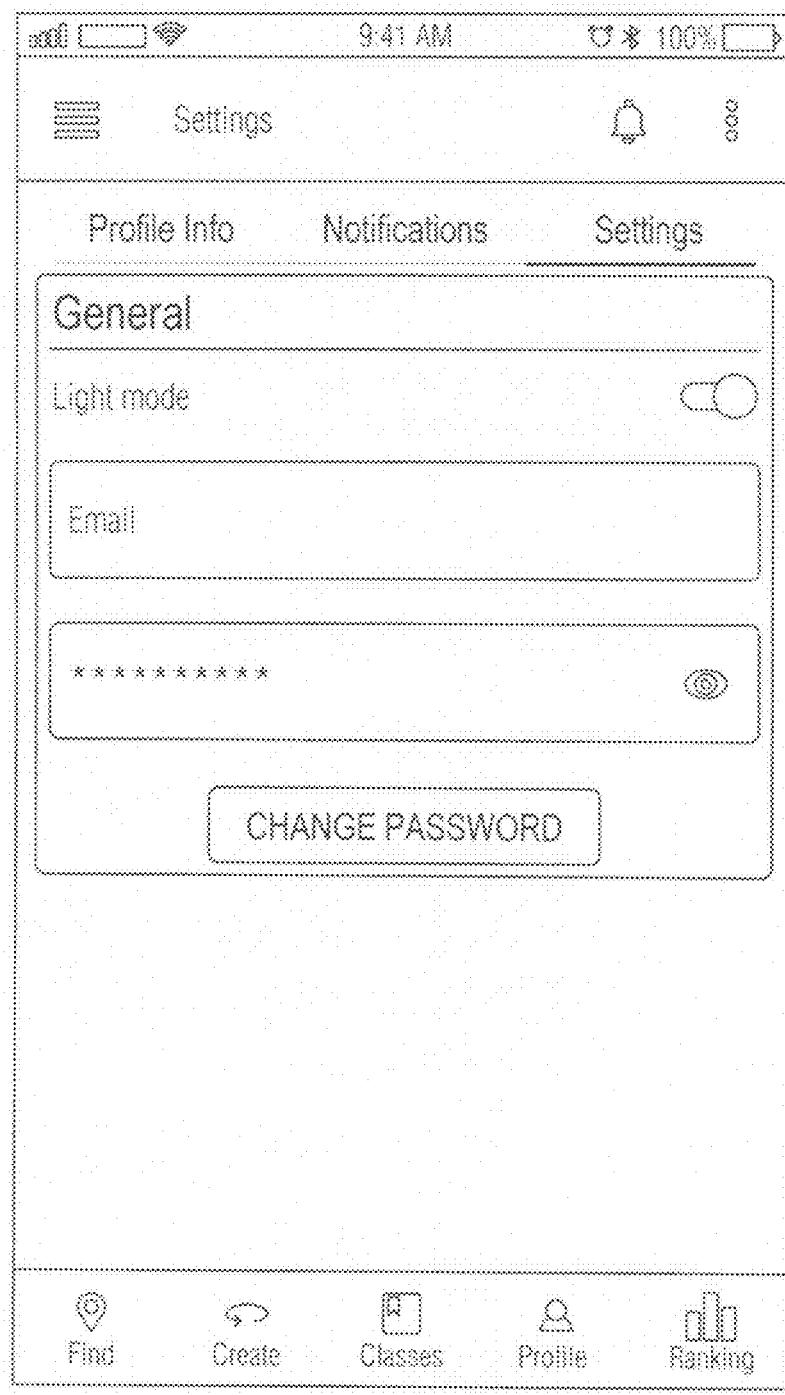
FIG. 28 is a wireframe view of an illustrative display screen provided by an interactive interface, according to various embodiments of this disclosure.

FIG. 28 depicts a representative display screen of the interactive interface as presented to a user through which a user may view and/or modify their account settings.

Figure 29:
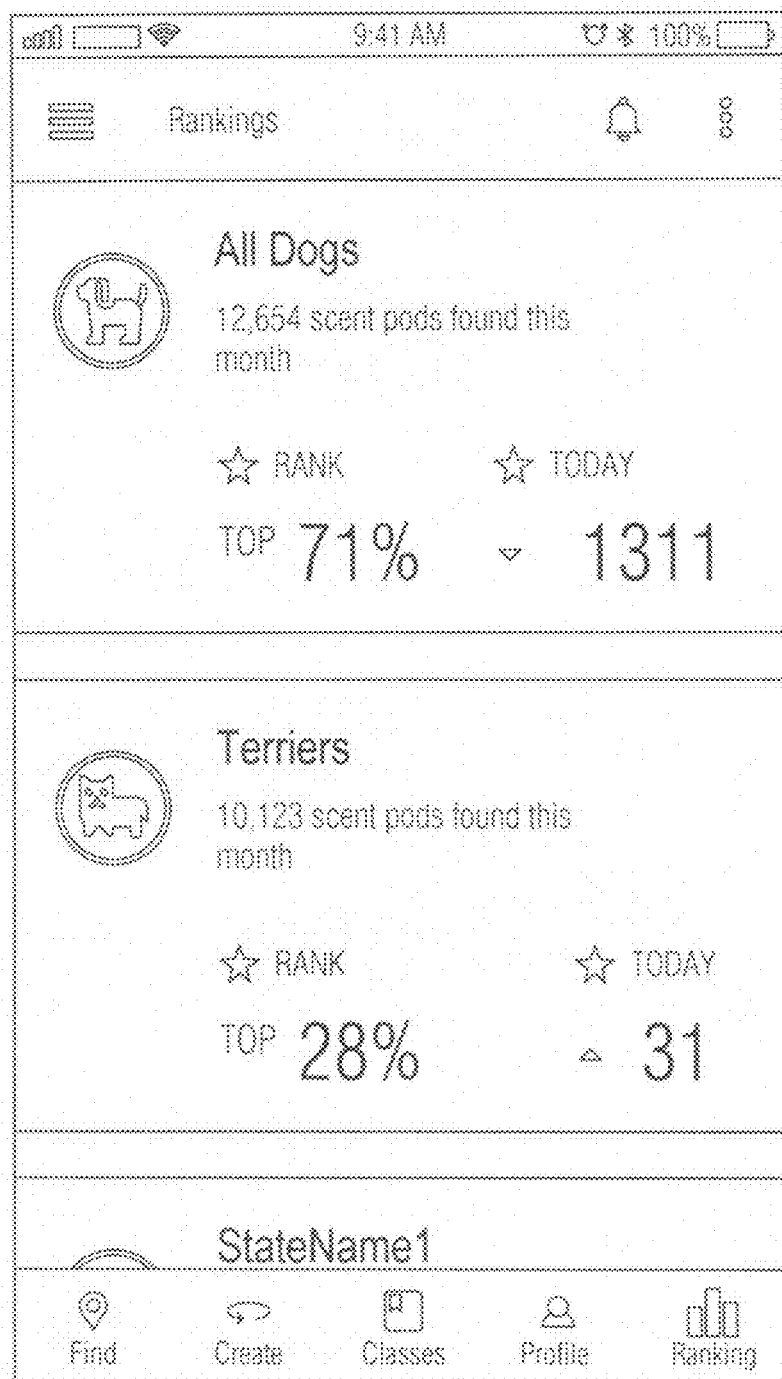
FIG. 29 is a wireframe view of an illustrative display screen provided by an interactive interface, according to various embodiments of this disclosure.

FIG. 29 depicts a representative display screen of the interactive interface as presented to a user wherein a user may view their rankings with regard to their performance on one or more missions as compared to other users.

In an alternative embodiment, in lieu of an interactive interface, a conventional map may be used in connection with training systems and associated methods described herein. According to such an embodiment, a user may notate on the conventional map where the dog toy odor device has been placed and provide the annotated map to a dog handler. The handler and a dog may then walk, run, or otherwise travel to the vicinity where the dog toy odor device was placed, as noted on the map. The handler and the dog may then attempt to locate the dog toy odor device.

Operators of the interactive platform may charge a subscription fee to use the platform thereby allowing for monetization of training exercises enabled by the present disclosure.

While various aspects have been described in the above disclosure, the description of this disclosure is intended to illustrate and not limit the scope of the invention. The invention is defined by the scope of the claims and not the illustrations and examples provided in the above disclosure.

Skilled artisans will appreciate additional aspects of the invention, which may be realized in alternative embodiments, after having the benefit of the above disclosure. Other aspects, advantages, embodiments, and modifications are within the scope of the claims.

What is claimed is:

1. A method for training dogs to detect an odor comprising:
   providing a dog toy odor device comprising:
      a housing unit comprising;
         one or more walls defining an interior space; and
         one or more emission apertures;
      an identification marker located on a surface of the housing unit;
      an odor carrier positioned within the interior space defined by the one or more walls of the housing unit;
   providing a geo-locating feature;
   positioning the dog toy odor device at a defined location;
   providing an interactive interface comprising an electronic map communicatively connected with the geo-locating feature;
   manually guiding the dog within between 5 feet and 25 feet from the dog toy odor device;
   ceasing manual guidance of the dog;
   waiting until the dog locates the dog toy odor device and noting the amount of time that passed from when manual guidance of the dog ceased until when the dog located the dog toy odor device.

2. The method of claim 1 wherein the dog toy odor device further comprises a removable lid.

3. The method of claim 2 wherein the one or more emission apertures are adjustable in size.

4. The method of claim 3 wherein the identification marker comprises a QR code.

5. The method of claim 4 wherein the interactive interface comprises a display screen on a computer or on a smartphone.

6. The method of claim 5 wherein the interactive interface comprises a competition tracking feature.

7. The method of claim 5 wherein the odor carrier comprises a scent-impregnated material.

* * * * *